United States Patent [19]

Lucas, Jr.

[11] Patent Number: 5,687,876

[45] Date of Patent: Nov. 18, 1997

[54] METHOD AND IMPROVED APPARATUS FOR SEPARATING AND DISPENSING COFFEE FILTERS

[76] Inventor: Orlan R. Lucas, Jr., 1102 Sylvan, Apt. 8, Emporia, Kans. 66801

[21] Appl. No.: 287,130

[22] Filed: Aug. 8, 1994

Related U.S. Application Data

[63] Continuation-in-part of Ser. No. 61,077, May 14, 1993, abandoned.

[51] Int. Cl.[6] .................................................. B65H 3/02
[52] U.S. Cl. .................................................. 221/259; 221/36
[58] Field of Search .................................. 221/45, 36, 259, 221/213, 210

[56] References Cited

U.S. PATENT DOCUMENTS

| | | | |
|---|---|---|---|
| 4,214,673 | 7/1980 | Heath et al. | 221/259 |
| 4,676,396 | 6/1987 | Mamolou | 221/36 |
| 4,796,779 | 1/1989 | Mamolou | 221/36 |
| 4,905,870 | 3/1990 | Mamolou | 221/36 |
| 4,971,222 | 11/1990 | Rohde et al. | 221/210 |
| 5,067,627 | 11/1991 | Anderson | 221/36 |
| 5,097,984 | 3/1992 | Meisner | 221/37 |
| 5,197,630 | 3/1993 | Kirla | 221/37 |
| 5,322,190 | 6/1994 | Bartley | 221/259 |
| 5,335,817 | 8/1994 | Powers | 221/43 |

*Primary Examiner*—William E Terrell
*Assistant Examiner*—Tamara Kelly
*Attorney, Agent, or Firm*—John W. Carpenter

[57] ABSTRACT

A coffee filter container and/or dispenser for containing and dispensing coffee filters. The coffee filter container and/or dispenser comprises a base, a housing, a lid, a pair of opposed filter stops, and a filter engager. The filter engager and the filter stops cooperate with each other to separate one coffee filter from a stack of filters disposed in the housing. A method or process separating a coffee filter from a stack of coffee filters.

10 Claims, 29 Drawing Sheets

METHOD AND IMPROVED APPARATUS FOR SEPARATING AND DISPENSING COFFEE FILTERS

This is a continuation-in-part application of application having Ser. No. 08/061,077 filed May 14, 1993 now abandoned. Benefit of the earliest filing date of May 14 1993 is claimed.

FIELD OF THE INVENTION

This invention generally relates to containers and dispensers. More specifically, this invention relates to a method and apparatus for separating and dispensing a coffee filter from a stack of coffee filters.

BACKGROUND OF THE INVENTION

Coffee filters, as supplied by commercial vendors, usually are available as compressed, superimposed stacks. These stacks often are left on a counter-top, in a cupboard, or in the half-opened package that they were sold in. The need and necessity for hygienely storage of such filters is poorly addressed by commercial manufacturers and in the commercial markets generally. As a coffee filter directly contacts water, the latter is capable of picking up (through suspension) dust and other debris that had contacted and settled on the filter from exposure to the atmosphere. The dust and debris in the water is capable of being passed into the produced coffee. Thus, it is evident that proper storage of coffee filters if preferable for general good hygiene, to protect the filters from airborne dust, pollen, smoke, etc.

Additionally, to separate one filter from the stack of filters is a task generally reserved for the most nimble-fingered. As the coffee filters are generally supplied in superimposedly compressed stacks, they are difficult to separate from one another because of their compressed state. Thus, there is a need for a device which is capable of separating a single coffee filter from a stack of coffee filters while simultaneously storing and protecting the coffee filters from contaminating particulate matter. Again, the commercial market has poorly addressed this need.

Therefore, what is needed and what has been invented by me is a container which separates and dispenses, one at a time, coffee filters.

SUMMARY OF THE INVENTION

The present invention accomplishes its desired objects by broadly providing a coffee filter container and/or dispenser for containing one or more coffee filters and/or having at least one coffee filter dispensed therefrom. The filter container and dispenser comprises a base; a housing container secured to the base for retaining the least one coffee filter; and a lid member pivotally secured to a perimeter of the housing container. A filter engaging means is provided for engaging a coffee filter. The filter engaging means is secured to the lid member such that when the lid member is elevated from a resting position on the perimeter, the filter engaging means engages at least one coffee filter. A pair of opposed filter stop members is secured to the housing container in proximity to the perimeter for movementally arresting a plurality of coffee filters that the filter engaging means is capable of moving and does move. The filter engaging means may pass a single coffee filter between the filter stop members while the filter stop members arrest the movement of any of the remaining coffee filters. The filter engaging means comprises a first arm member that is connected to the lid member and is pivotally secured to a second arm member. A lip member is secured in any fashion (e.g. integrally, etc.) to the second arm member. The lip member has a structure defining a means for engaging and initially moving a plurality of stacked coffee filters and for subsequently removing a single coffee filter from the plurality of stacked coffee filters. Preferably the means for engaging and for subsequently moving is a plurality of teeth disposed on an edge of the lip member. The first arm member comprises a structure defining a stop means for stopping the pivotal motion of the second arm member pivotally secured thereto. The lip member of the coffee filter engaging means includes a bottom surface that is smooth. The lid member comprises a first plate secured to the perimeter of the housing container and a second plate member pivotally secured to the first plate member such that the second plate member may be hingeably operated relative to the first plate member. The filter engaging means is preferably secured to the second plate member.

The present invention further provides a process for removing a coffee filter disposed in a coffee filter container and/or dispenser comprising the steps of:

(a) providing a coffee filter container and/or dispenser having a housing container, a base, a lid member, a pair of opposed filter stop members, and a filter engaging means for engaging and initially moving one or more coffee filter(s) and for subsequently removing a single coffee filter from the one or more coffee filter(s);

(b) opening the lid member of the coffee filter container and/or dispenser whose housing container includes an inner wall surface;

(c) disposing one or more coffee filter(s) in the housing container of the coffee filter container and/or dispenser;

(d) closing the lid member to dispose the filter engaging means in the inside of the housing container;

(e) lifting and/or opening the lid member to cause a lip means or member of the filter engaging means to swing towards the one or more coffee filter(s), more particularly towards an inner side wall of a top coffee filter;

(f) engaging the inner wall of top coffee filter to cause the one or more coffee filter(s) to move upwardly along the inner wall surface of the housing container as the lid member is continually being lifted, until the one or more coffee filter(s) contact the pair of opposed filter stop members;

(g) pulling the coffee filter away from the one or more coffee filter(s) and between the opposed filter stop members as the lid member is further continually being lifted;

(h) opening and/or lifting essentially all the way back or to the rear the lid member to produce the coffee filter from the coffee filter container and/or dispenser.

The present invention further provides a process for separating a coffee filter from a stack of coffee filters comprising the steps of:

(a) providing a coffee filter container and/or dispenser having a housing container, a base, a lid member, a pair of opposed filter stop members, and a filter engaging means for separating the coffee filter from the stack of coffee filters;

(b) opening and/or lifting upwardly the lid member of the coffee filter container and/or dispenser;

(c) disposing a stack of coffee filters including a top filter in the housing container of the coffee filter container and/or dispenser;

(d) closing the lid member to dispose the filter engaging means on the inside of the housing container such that an inner side wall of the top filter surrounds a portion of the filter engaging means;

(e) lifting and/or opening the lid member to cause a lip means or member of the filter engaging means to swing towards the inner side wall of the top filter and to engage the same and commence moving the stack of coffee filters as the lid member is continually being lifted;

(f) pulling the stack of coffee filters towards the opposed filter stop members as the lid member is further being lifted;

(g) engaging the stack of coffee filters against the opposed filter stop members after the lid member is still further lifted such that top edge(s) of the stack of coffee filters abutts against a bottom face of each opposed filter stop member;

(h) continuing to lift the lid member such that the filter engaging means commences to coerce and/or force the stack of filters against the opposed filter stop members and to commence moving the top filter away from the stack of coffee filters;

(i) continuing further to lift the lid member to pull the top filter away from the stack of coffee filters and between the opposed filter stop members to produce the top filter and thereby separating a coffee filter from the stack of coffee filters.

It further yet an object of the present invention to provide a coffee filter container for containing at least one coffee filter and for singularly dispensing the at least one coffee filter comprising a generally cylindrical sidewall member having a sidewall top and a filter support member secured to the generally cylindrical sidewall member for supporting at least one coffee filter. A top assembly is removably secured to the generally cylindrical sidewall member. The top assembly comprises a structure defining a top planar member, a pair of arms secured to the top planar member in a generally planar relationship, a pair of stop members having a stop member size and secured to the arms, and a lid member pivotally secured to the top planar member and substantially extending across the top planar member and having a structure defining a pair of cut-outs with cut-out openings slightly larger than the stop member size of the stop members. A means for engaging a filter member is secured to the lid member. The means for engaging a filter member comprises a pair of bifurcated stanchion members secured to the lid member and a tube member secured to respective ends of the pair of bifurcated stanchion members, which has a pair of tube recesses. A gripping assembly is pivotally secured to the tube member and defines a gripping body having a structure defining a pair of gripping arms having secured thereto a pair of opposed protruding ear members with ear ends which rotatively reside in the tube recesses. A generally T-shaped flexible arm assembly is secured to the gripper body, and a blade is secured to the body. The blade has a structure defining teeth having at least one blunted tooth and at least one pointed tooth.

It is further yet an object of the present invention to provide a method for separating a single coffee filter from a plurality of super-imposedly stacked coffee filters comprising the steps of:

(a) providing a coffee filter container and dispenser comprising a generally hollow body, a base secured to the generally hollow body, a top assembly removably engaged to the generally hollow body comprising a pivotally disposed lid member and a pair of oppose stop members, and a means for engaging a filter comprising a pair of bifurcated stanchion members, a tube member secured to respective ends of the pair of bifurcated stanchion members and having a pair of tube recesses; a gripping assembly pivotally secured to the tube member and defining a gripping body having a structure defining a pair of gripping arms having secured thereto a pair of opposed protruding ear members with ear ends which rotatively reside in the tube recesses, a generally T-shaped flexible arm assembly secured to the gripper body, and a blade secured to the body and having a structure defining teeth having at least one blunted tooth and at least one pointed tooth.

(b) providing super-imposedly stacked coffee filters;

(c) removing the top assembly and placing the coffee filters in the generally hollow body;

(d) closing the lid member of the top assembly;

(e) pivotally lifting on the lid member to simultaneously swing the means for engaging a coffee filter towards an edge of a single coffee filter;

(f) pulling the single coffee filter between the stop members to produce the stop members.

It is therefore an object of the present invention to provide an apparatus and process/method for removing a coffee filter from a plurality of superimposedly, stacked coffee filters.

These, together with the various ancillary objects and features which will become apparent to those skilled in the art as the following description proceeds, are attained by this novel method and apparatus, a preferred embodiment being shown with reference to the accompanying drawings, by way of example only, wherein;

BRIEF DESCRIPTION OF THE DRAWINGS

FIG. 10b is a side elevational view of the embodiment of the filter engaging means shown in FIG. 10a;

FIG. 11c is a top plan view of the embodiment of the filter engaging means shown in FIG. 11a;

FIG. 17b is a top plan view of the embodiment of the filter engaging means shown in FIG. 17a;

FIG. 18b is a side elevational view of the embodiment of the filter engaging means shown in FIG. 18a.

DETAILED DESCRIPTION OF THE INVENTION

Figure 1:
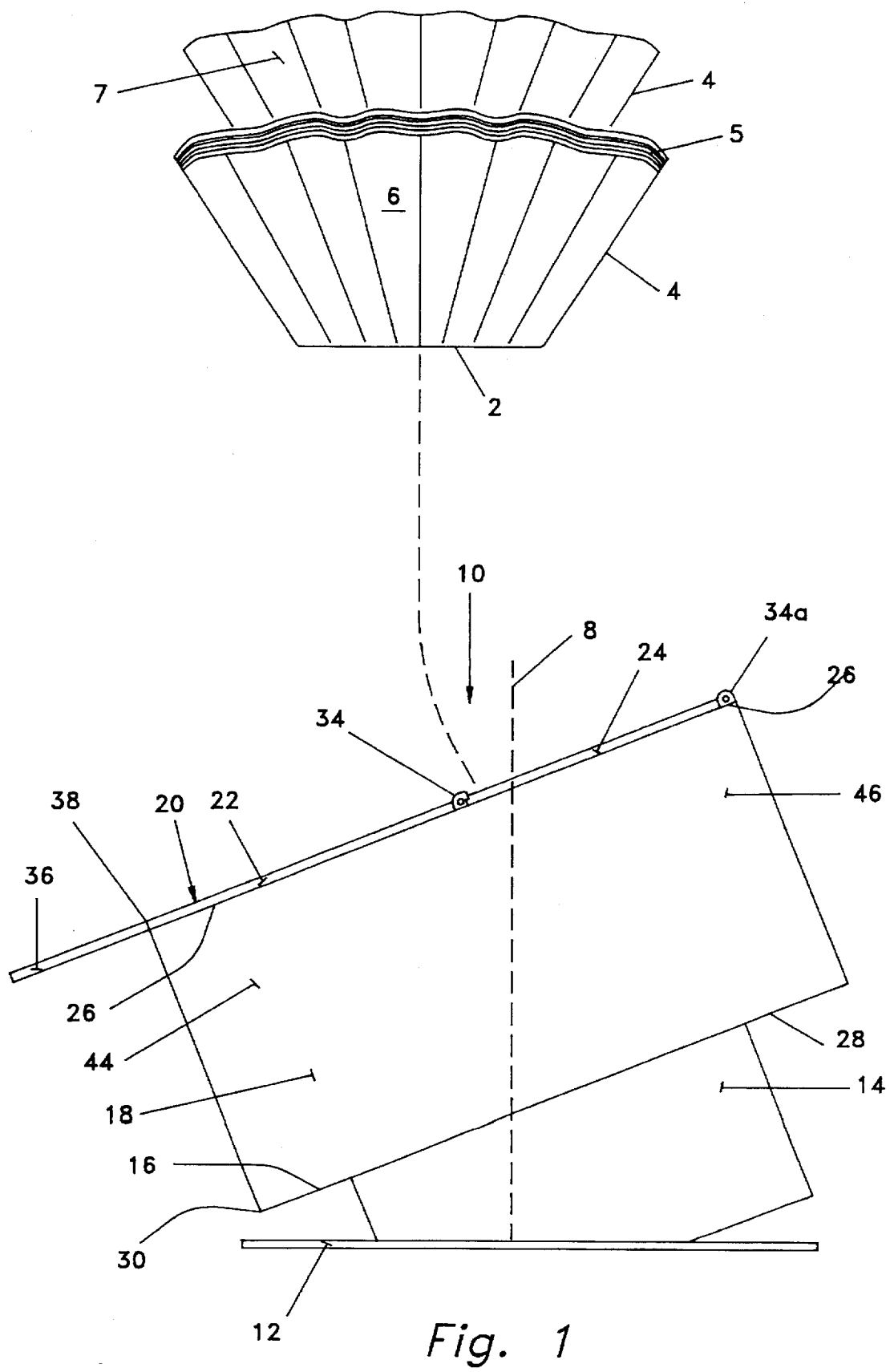
FIG. 1 is a side elevational view of the coffee filter container and/or dispenser of the invention with the coffee filters removed therefrom and having a lid that is closed.
Figure 2:
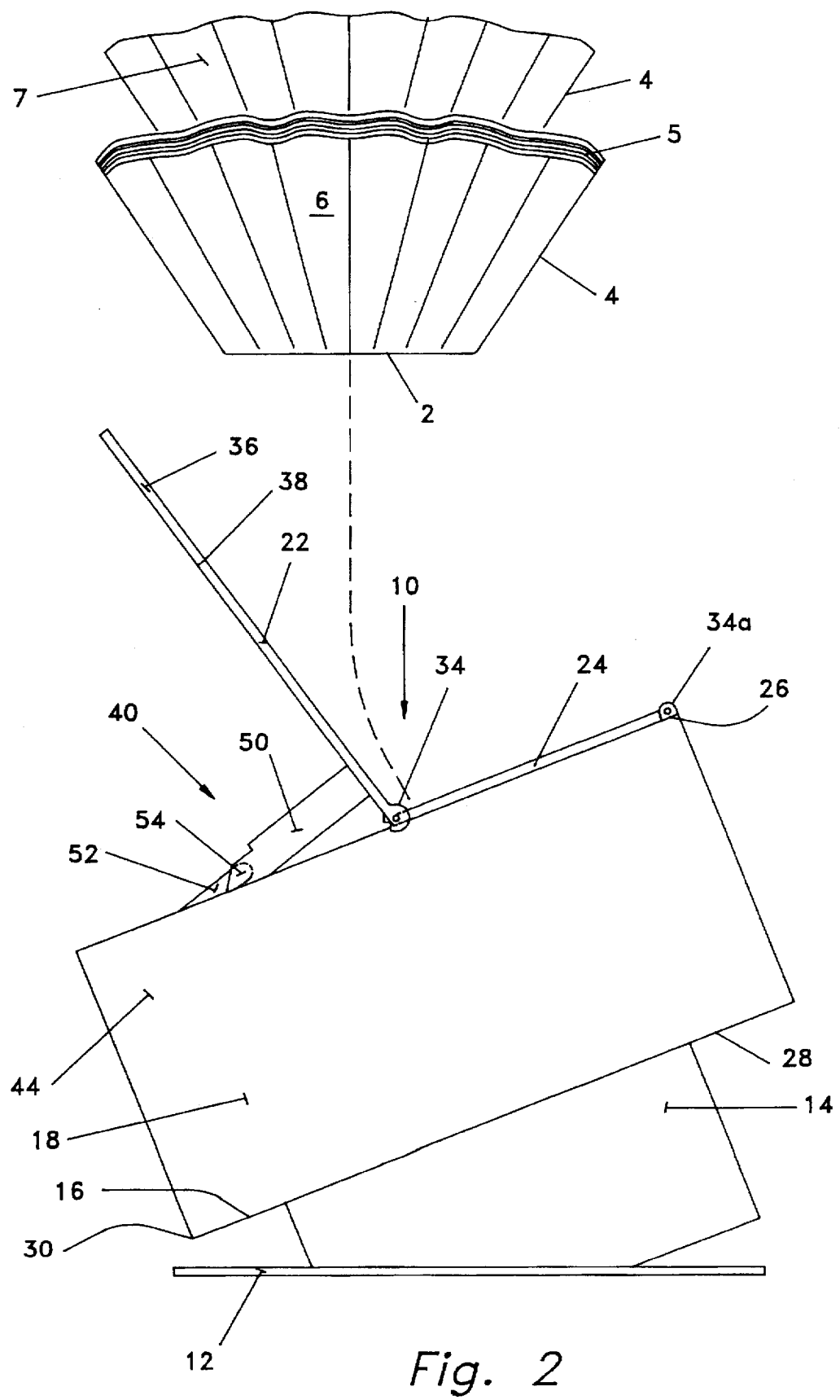
FIG. 2 is a side elevational view of the coffee filter container and/or dispenser of the invention with the coffee filters removed therefrom, and having a first plate of the lid partially opened and revealing a portion of a filter engaging means.

Turning now to the drawings wherein similar parts of the invention are identified by like reference numerals, there is seen in FIG. 1 a coffee filter container and/or dispenser, generally illustrated as 10. The coffee filter container/dispenser 10 receives a plurality of coffee filters 6 for the purpose of storing the filters 6 and dispensing the filters 6 one at a time upon demand. Coffee filters 6 as such are generally known in the art and are commercially available under a variety of brand names. Such filters 6 are generally packaged in a stack, say a stack containing a plurality of coffee filters 6 such as 100 or more. The filters 6 are packaged in a manner that generally compresses the filters 6, so that the filters 6 are fairly difficult to separate one filter from the stack. The present invention separates one filter 7 from the stack of filters 6 and lifts it therefrom (see FIG. 8).

Figure 3:
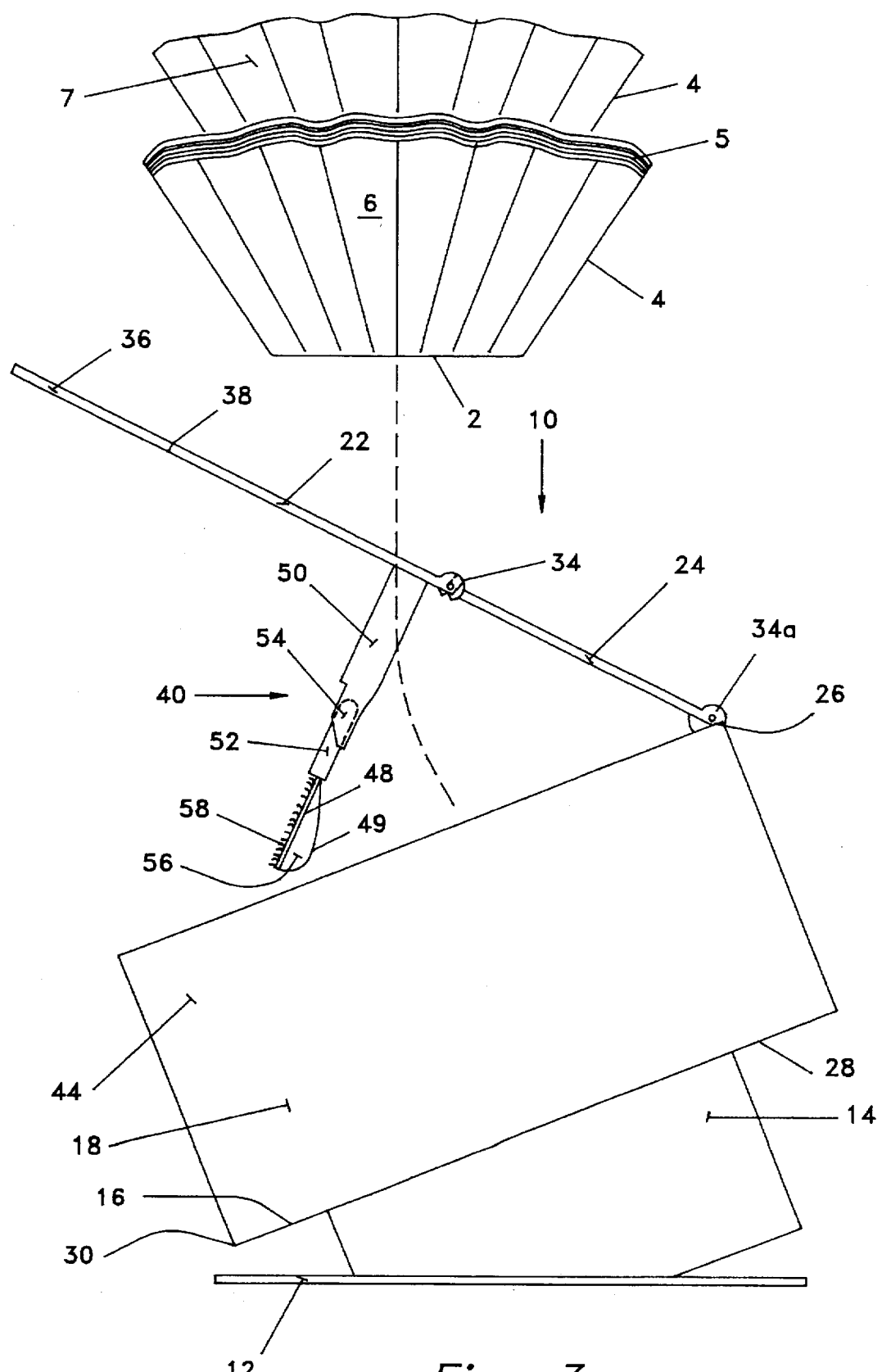
FIG. 3 is a side elevational view of the coffee filter container and/or dispenser of the invention with the coffee filters removed therefrom, having the entire lid partially opened and revealing the filter engaging means.

To this end, one embodiment of the coffee filter container and/or dispenser 10 is depicted in FIG. 1. As shown in FIG. 1, the coffee filter container and/or dispenser 10 generally comprises a base 12. A first side wall member 14 is secured to the base 12 and a partition or bottom member 16 is secured to the top of the first side wall member 14. Similarly, a second side wall member 18 is secured to the top of the partition member 16, and a lid member, generally illustrated as 20, is pivotally secured to the second side wall member 18. Additionally, as shown in FIG. 3, a filter engaging means 40 for engaging a coffee filter 7 is secured to the lid member 20. The side wall member 14 and the side wall member 18 may possess any suitable geometric form, preferably a cylinder form such that side wall members 14 and 18 are respectively a continuous circular wall. The filtering engaging means 40 defines a means for engaging and initially moving the plurality of coffee filters 6 and for subsequently removing a single coffee filter 7 from the stacked coffee filters 6.

Referring again to FIG. 1, the first side wall member 14 is secured to the base 12, such that the first side wall member 14 has a forward angular posture of from about 10° to about 30°, more preferably from about 15° to about 25°, most preferably about 20°, from a perpendicular or normal line or plane 8 taken from or extending from a horizontal plane 9 taken along or registering with the base 12 (when base 12 is disposed on a generally horizontal surface). The partition member 16 secures the first wall member 14 to the second wall member 18, thus the second wall member 18 likewise has a forward angular posture that is the same as the first side wall member 14 from the perpendicular or normal line or plane 8 (i.e. the second wall member 18 has a forwardly inclined angular disposition, congruent with the first wall member 14). This general angular disposition of the container and/or dispenser 10 facilitates easy removal and installation of coffee filters and is one of the salient features of this embodiment of the invention.

Figure 6:
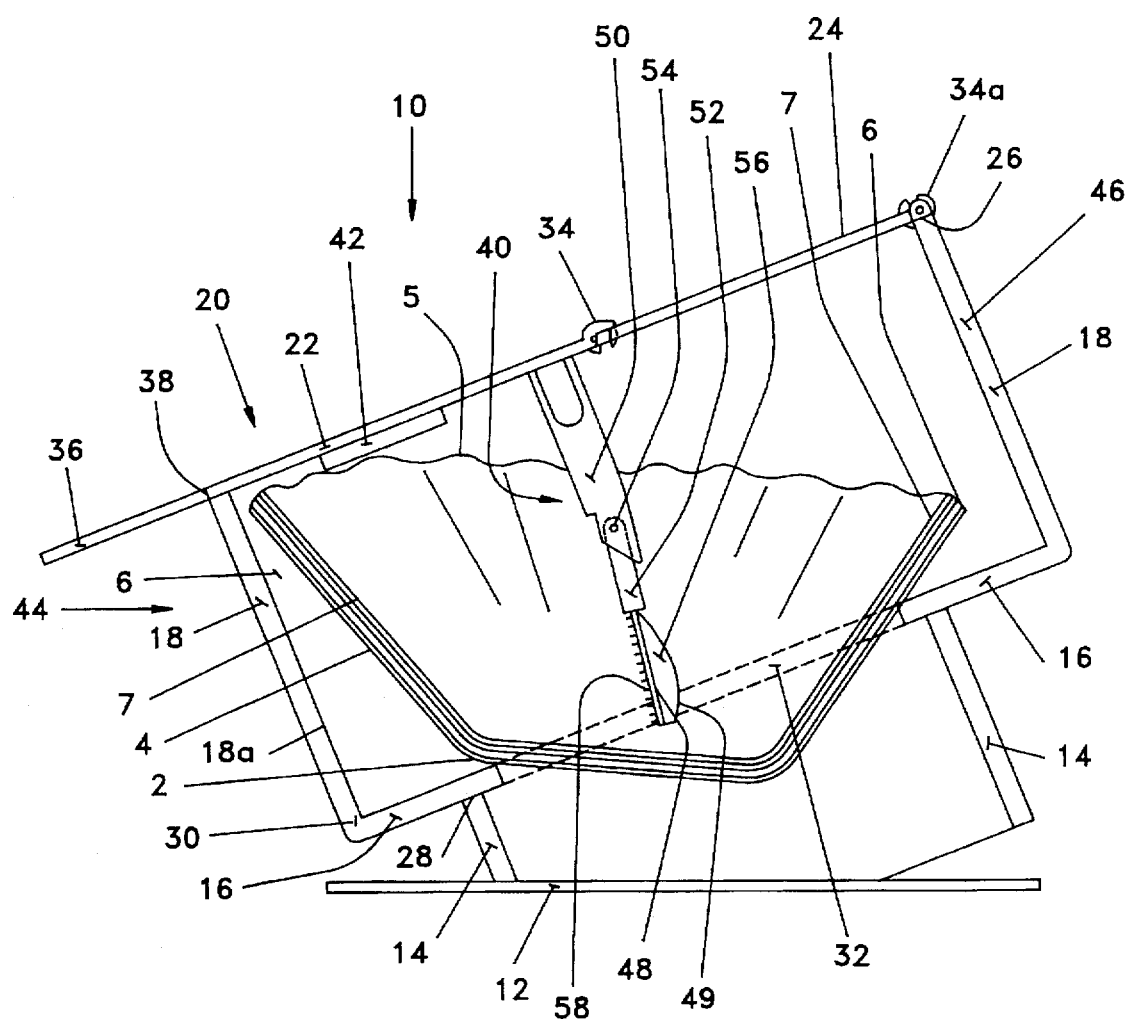
FIG. 6 is a side cutaway view of the coffee filter container and/or dispenser of the invention with the coffee filters disposed therein, and having the entire lid closed.

A commercially available coffee filter 7 generally comprises a circular sheet of paper that is folded to define a bottom 2 and a circular wall 4. This circular wall 4 has an angular disposition of from about 65° to about 95° from the horizontal, as the filter 7 rests on a generally horizontal surface. As best shown in FIG. 6, the forward angular posture of the coffee filter container and/or dispenser 10 allows the plurality of coffee filters 6 to rest in a generally horizontal posture, such that the circular wall 4 of the stack of coffee filters 6 rests generally parallel to the second side wall member 18. The partition member 16 is secured to a top edge 28 of the first wall member 14 and is secured to a bottom edge 30 of the second wall member 18, such that the first wall member 14 and the second wall member 18 are coupled by the partition member 16, as indicated above.

Figure 5:
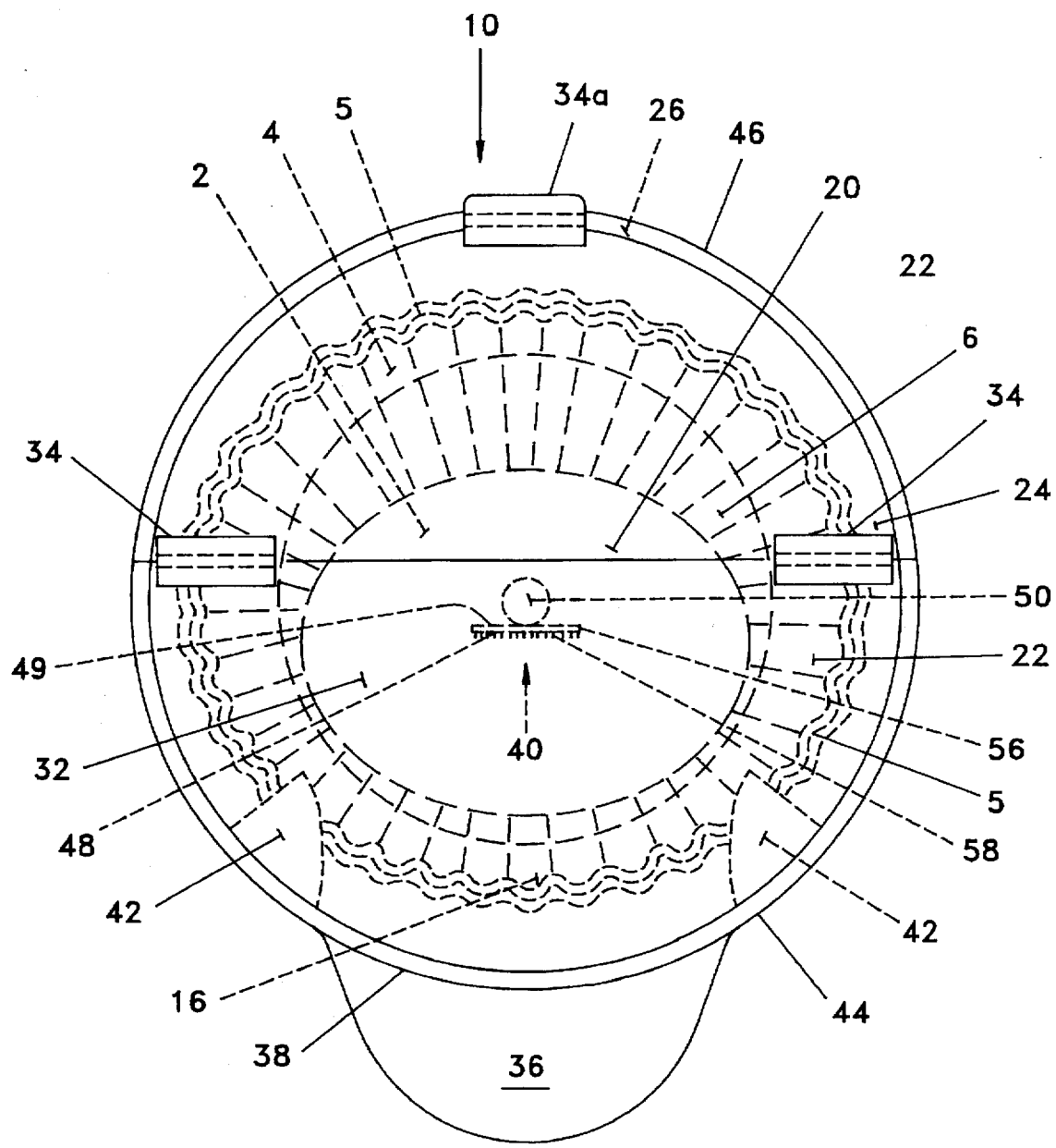
FIG. 5 is a top plan view of the coffee filter container and/or dispenser of the invention with the coffee filters disposed therein, disclosing an aperture in a partition or floor member.
Figure 21:
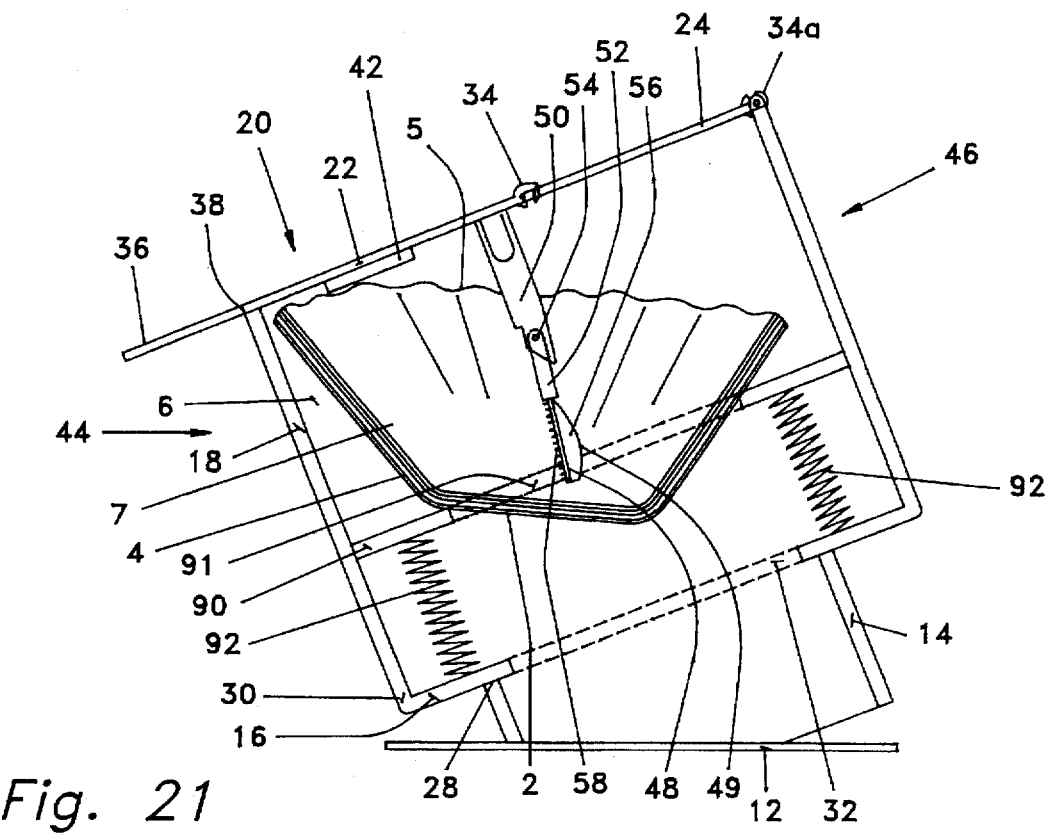
FIG. 21 is a side cutaway view of another embodiment of the coffee filter container and/or dispenser disclosing a spring biased floor.
Figure 21A:
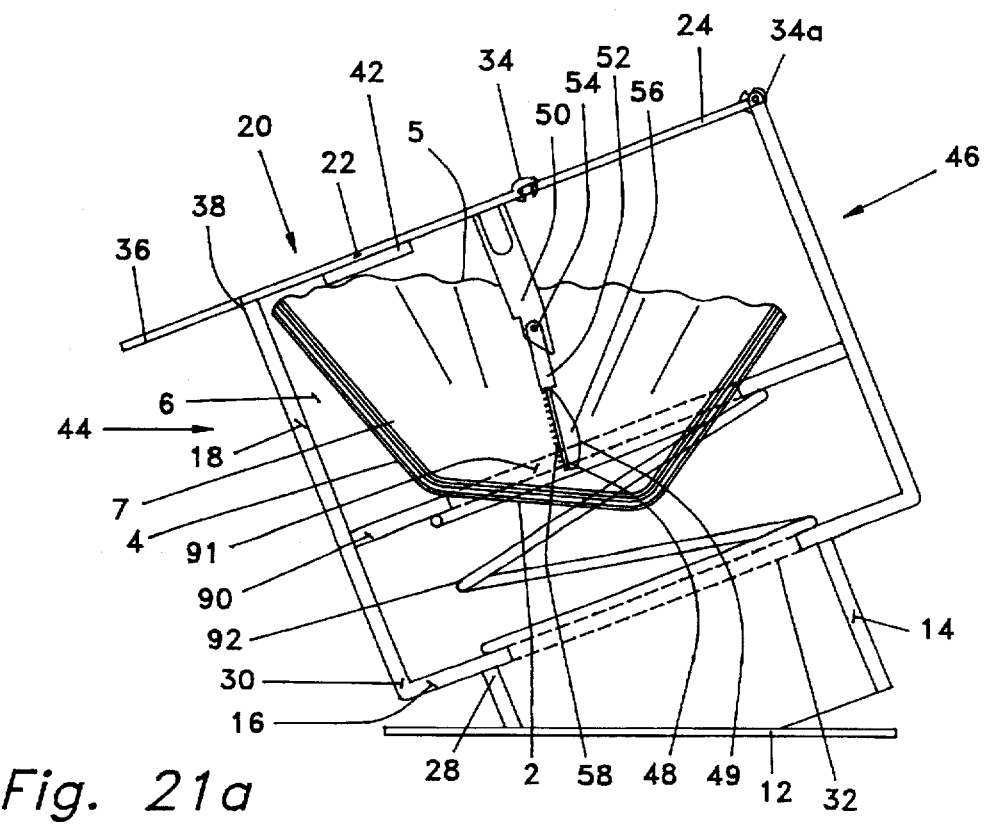
FIG. 21a is a side cutaway view of the embodiment of FIG. 21 disclosing an alternate spring to bias the floor.
Figure 21B:
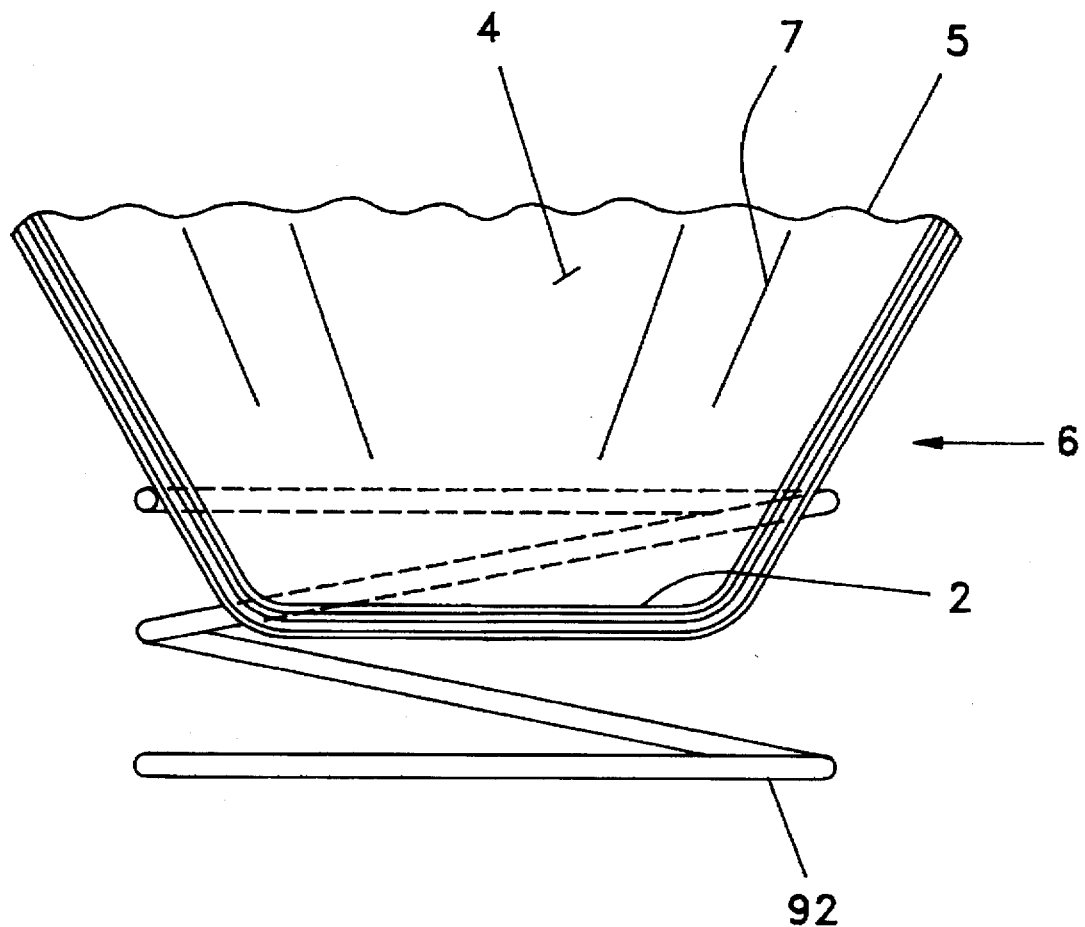
FIG. 21b is a perspective view of the coffee filters residing on a spring.

As shown in FIG. 5, the partition member 16 preferably (but not necessarily) comprises a structure defining an aperture 32 disposed therein. Aperture 32 allows a portion of the stack of coffee filters 6 to reside therethrough, thereby allowing the coffee filters 6 to rest in a generally horizontal position. Alternatively, as shown in FIG. 21 a secondary floor member 90 may be movably and/or slidably disposed above the partition member 32. The secondary floor member 90 defines a structure that generally comprises a disc in shape preferably (but not necessarily) having an aperture 91 disposed therein. For the embodiment shown in FIG. 21, a plurality of spring members 92—92 bias the secondary floor member 90 generally upwards, such that as the stack of filters 6 disposed in the coffee filter container and/or dispenser 10 is depleted the secondary floor member 90 pushes the remainder of the stack of filters 6 generally upwards whereupon they may be engaged by the filter engaging means 40. Like the aperture 32 of the partition member 16, the aperture 91 of the secondary floor member 90 allows a portion of the stack of coffee filters 6 to pass therethrough such that the stack of coffee filters 6 rests in a generally horizontal position. It can be appreciated that the secondary floor member 90 may be contacted by a (or single) one spring member 92 (see FIG. 21A) and function properly. The secondary floor member 90 itself may be omitted whereupon the stack of coffee filters 6 resides on the spring member 92 directly (see FIG. 21B). In the case the stack of coffee filters 6 reside on the spring member 92 directly, the spring member 92 generally helically surrounds the stack of coffee filters 6, as further shown in FIG. 21B.

Figure 7:
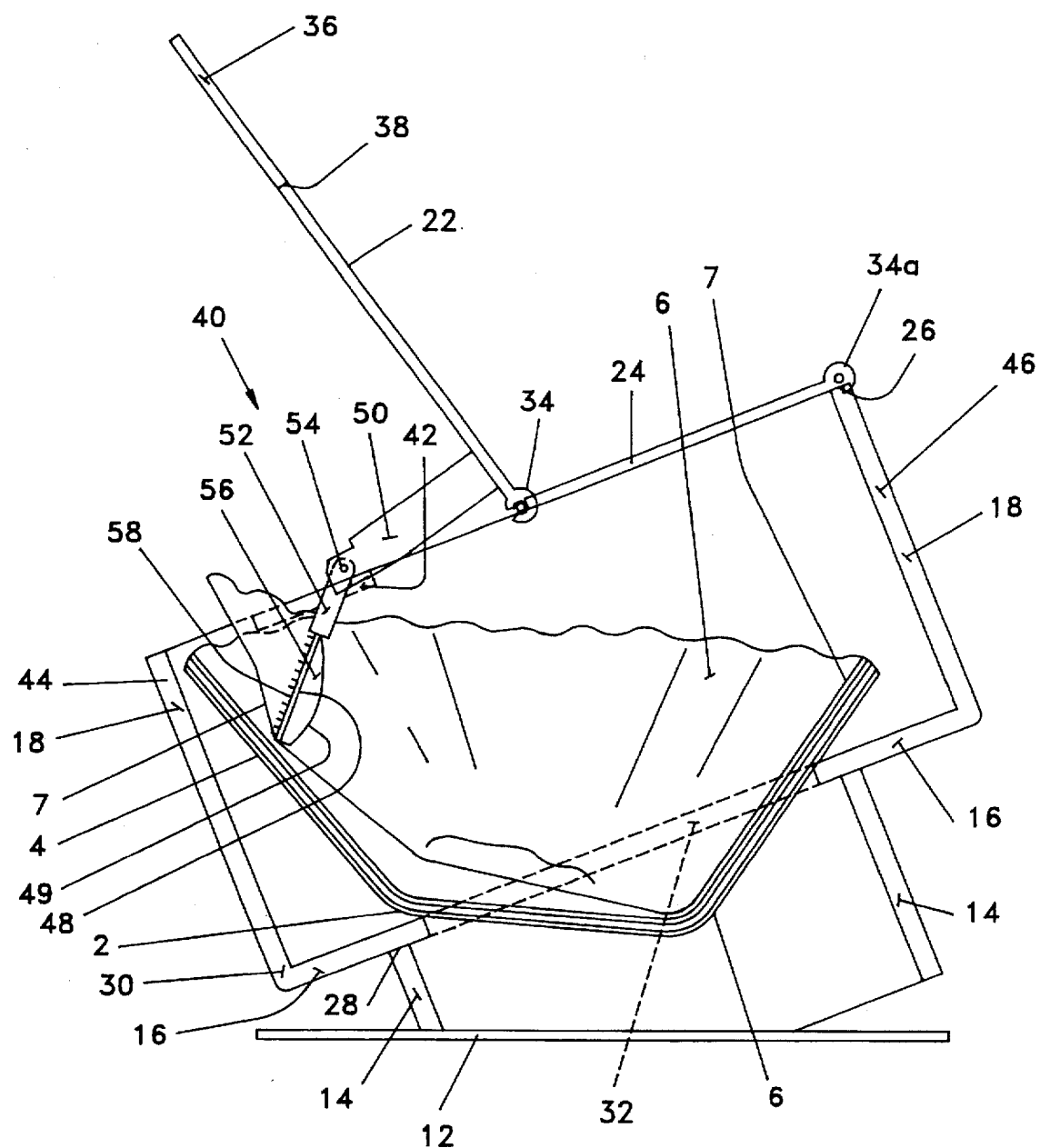
FIG. 7 is a side cutaway view of the coffee filter container and/or dispenser of the invention with the coffee filters disposed therein, and having the first plate of the lid partially opened, disclosing the filter engaging means engaged to a single filter and pulling the latter off of or away from the stack of filters while the stack of filters is engaged to one or more stop member(s) or means.
Figure 8:
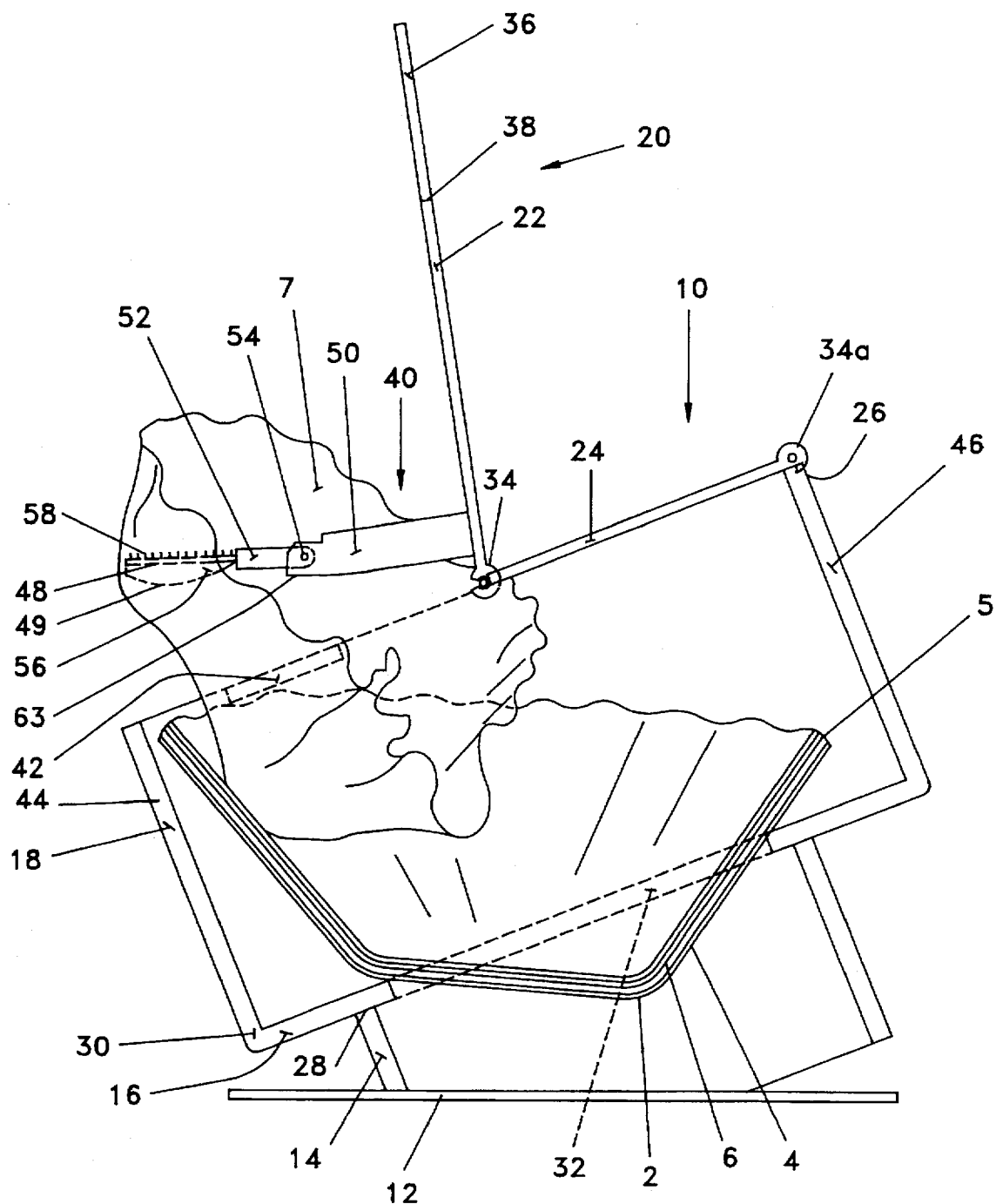
FIG. 8 is a side cutaway view of the coffee filter container and/or dispenser of the invention with the coffee filters disposed therein, and having the first plate of the lid fully opened, disclosing the filter engaging means engaged to the single filter, and having the single filter separated from the stack of filters, and disclosing the stack of filters engaged to a stop member.
Figure 19:
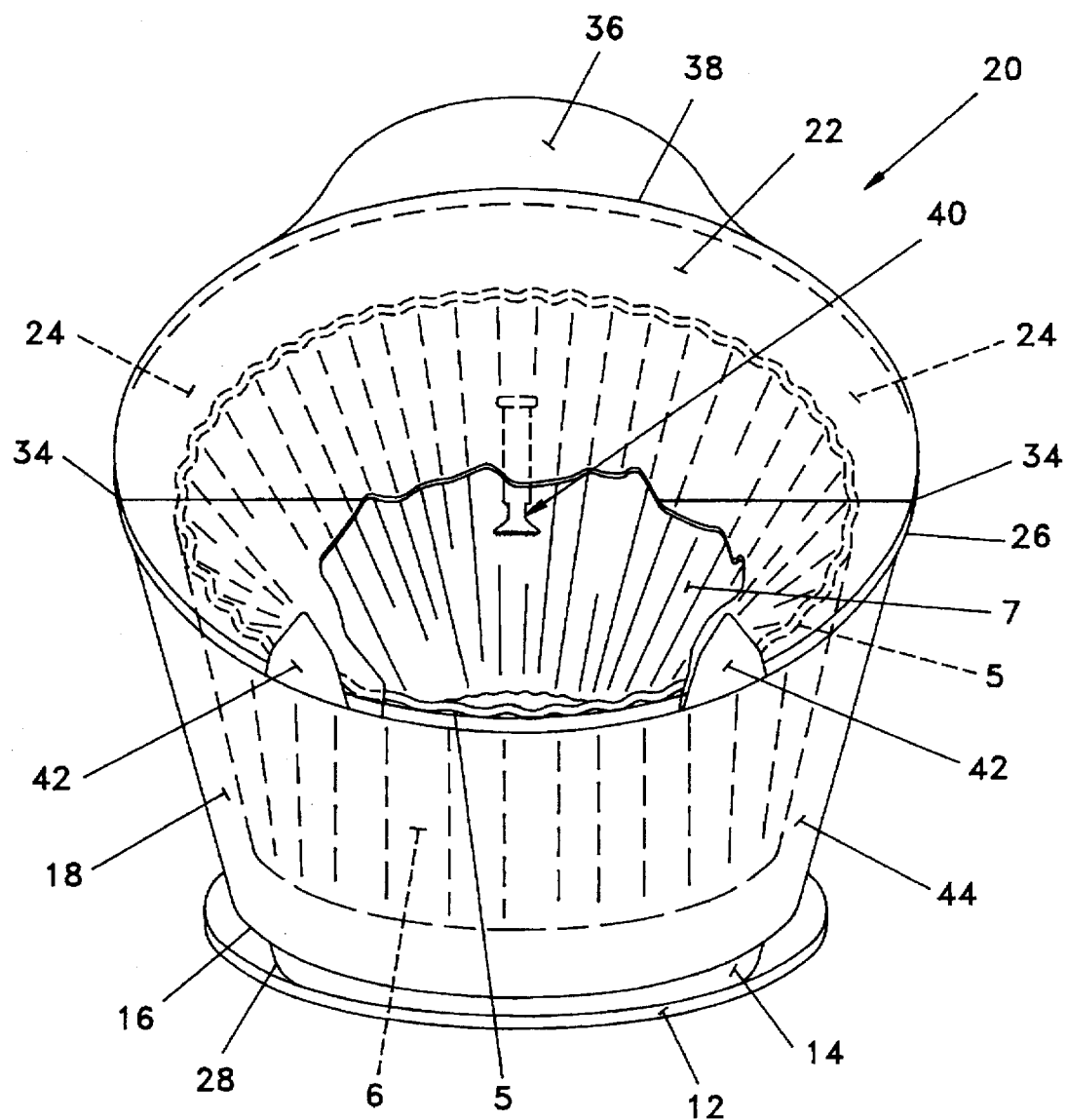
FIG. 19 is perspective view of an embodiment of the coffee filter container and/or dispenser with the lid open and a single coffee filter engaged to the coffee filter engaging means wherein the single coffee filter is removed therefrom.

Continuing to refer to the drawings and in particular to FIG. 5, the lid member 20 defines a structure comprising a pair of opposed semi-circular plate members: a generally semicircular first plate member 22 and a generally circular second plate member 24. The opposed plate members 22–24 are pivotally coupled by a pair of hinge members 34—34 such that the integral combination of the opposed plate members 22–24 and the hinge members 34—34 defines the lid member 20. The lid member 20 is preferably generally circular in shape, as shown in FIG. 5. The second plate member 24 may be secured to a top edge 26 of the side wall member 18. In a preferred embodiment of the invention, the second plate member 24 is preferably pivotally secured to the top edge 26 of the second side wall member 18 by another hinge member 34a. It is to be understood that the spirit and scope of the invention includes the second plate member 24 non-movably secured to the top edge 26 of the second wall member 18. The second wall member 18 preferably defines a cylindrical structure, preferably an integral cylindrical structure containing a front semi-circular half 44 and a rear semi-circular half 46. The hinge member 34a is preferably secured to the top edge 26 at the rear most section of the wall member 18, i.e. to the rear semi-circular half 46. More specifically, the second plate member 24 is preferably pivotally secured to the second wall member 18 along top edge 26 such that the second plate member 24 may be hingeably operated to open the container and/or dispenser 10 for facilitating the inspection, cleaning, refilling with coffee filters, etc, thereby entirely exposing the interior of the coffee filter container and/or dispenser 10. The first plate member 22 is preferably pivotally secured to the second plate member 24 such that the first plate member 22 may be hingeably operated to partially open the coffee filter container and/or dispenser 10 to sequentially remove coffee filters 6 from the container and/or dispenser 10 via the coffee filter engaging means 40, while simultaneously leaving the second plate member 24 in the closed position. As best depicted in FIGS. 7 and 8, when the first plate member 22 of the container and/or dispenser is opened as such, the coffee filter engaging means 40 attached thereto swings upwards, thereby engaging and subsequently moving the plurality of coffee filters 6 contained therein. As the first plate member 22 is continually being lifted, the plurality of coffee filters 6 move upwardly along an inner wall surface 18a (see FIG. 6) of the wall member 18. The upward movement of the plurality of coffee filters 6 is arrested however, by a pair of opposed stop members 42—42 secured to the front semi-circular half 44 of the second wall member 18 (see FIG. 5). Stop members 42—42 are secured thereto or formed therefrom and are spaced apart such that the filter engaging means 40 passes therebetween to remove and pass therebetween a single coffee filter (e.g. coffee filter 7) from the stacked coffee filters 6. A top edge 5 of the plurality of coffee filters 6 engages the bottom of stop members 42—42 when the coffee filter engaging means 40 pulls the plurality of coffee filters 6 upwards simultaneously with the continually lifting of the first plate member 22 of lid 20. A single innermost coffee filter 7 engaged to the filter engaging means 40 will be slidably removed from the remaining coffee filters 6 and slidably passes between the stop members 42—42, as the single filter 7 does not possess sufficient rigidity to provide resistance against the stop members 42—42 (see FIG. 19) The remaining coffee filters 6 will remain engaged to the bottom of stop members 42—42 since two or more coffee filters 6 possess the rigidity to remain lodged against the bottom of stop members 42—42 while the single filter 7 is being removed. Thus, the spirit and scope of the present invention includes the positioning of one or more coffee filters 6 within the container housing or side wall member 14 and the sequentially singularly removal and dispensing (through stop members 42—42) of one or more coffee filters 6 from within the container housing or side wall member 14 by the coffee filter engaging means 40. If one singular coffee filter (e.g. coffee filter 7) is disposed within the side wall member 14, the coffee filter engaging means 40 of the present invention is capable of removing and dispensing through stop members 42—42 the single coffee filter 7. If two superimposedly postured or positioned coffee filters (e.g. coffee filter 7 or a top coffee filter is compressed against a bottom coffee filter) are disposed within the container housing or side wall member 14, the coffee filter engaging means 40 of the present invention is capable of engaging and initially moving both top and bottom coffee filters until both come in contact with the bottom of the stop members 42—42 and subsequently disengaging the top coffee filter from the bottom coffee filter and passing the former through and/or between the stop members 42—42 while the bottom coffee filter (i.e. a top edge of same) remains engaged to the bottom of the stop members 42—42. The bottom coffee filter may subsequently be removed and dispensed through and/or between the stop members 42—42 with or by a second pass of the filter engaging means 40. The procedure may be repeated with three or four or five, etc., superimposedly stacked coffee filters 6. A first plate member 22 additionally comprises a structure defining a lip member 36 secured to a front edge 38 (see FIG. 5) of the first plate member 22. Lip member 36 is secured thereto or integrally formed therefrom to more easily hingeably operate the first plate member 22 in the operation of the coffee filter container and/or dispenser 10.

Figure 10A:
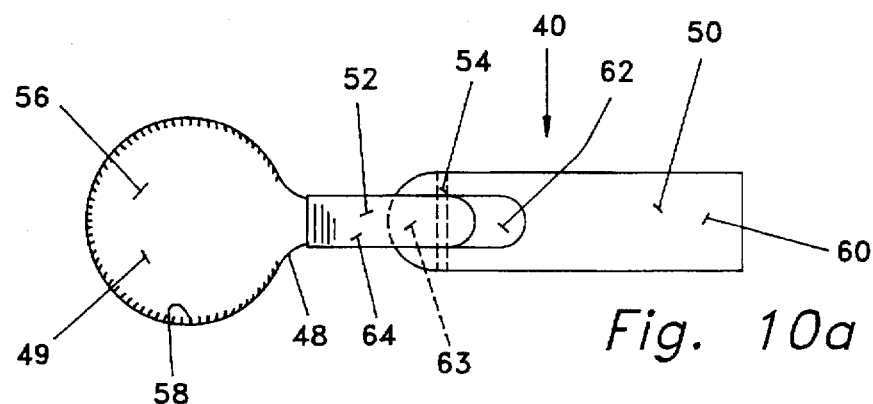
FIG. 10a is a top plan view of one embodiment of the filter engaging means of the invention.

The coffee filter engaging means 40 may take on or possess a plurality of manifestations or embodiments, one of which is shown in FIG. 10A. The filter engaging means 40 comprises a first arm member 58 hingeably and/or pivotally secured to a second arm member 52, preferably by a hinge member 54. The second arm member 52 has a lip member 56 secured thereto, or otherwise formed therewith. The lip member 56 preferably comprises a plurality of serrated teeth 58 disposed on a top edge 48 which engage the innermost coffee filter 7 of the plurality of coffee filters 6 (see FIG. 7).

Figure 20:
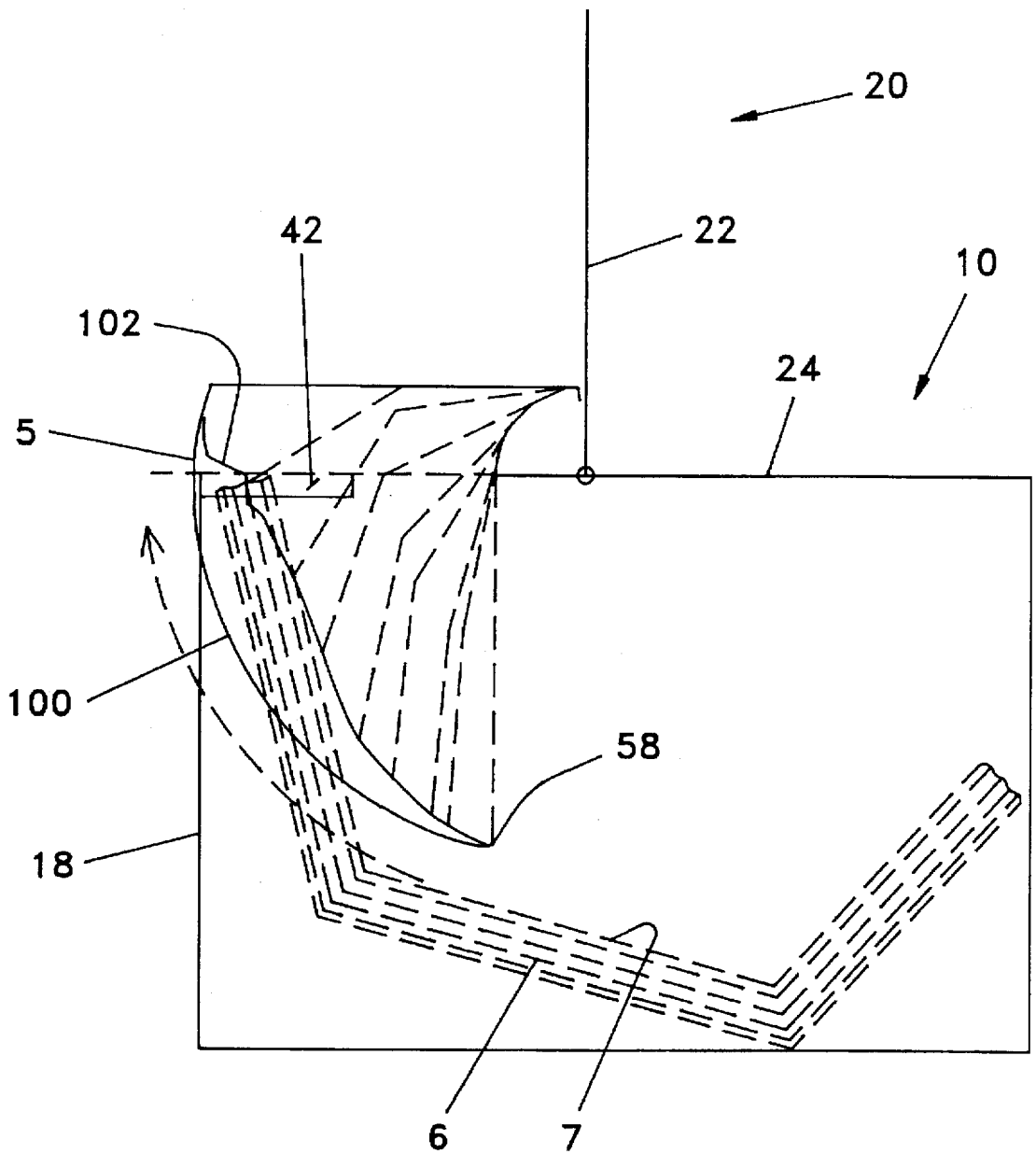
FIG. 20 is a schematic diagram depicting several arcs of travel of the coffee filter engaging means.

The bottom edge 49 of lip member 56 has a smooth surface such that the bottom edge 49 of the lip member 56 does not engage or snag the coffee filters 6 when first plate member 22 of lid 20 is closed. As shown in FIG. 7, the first arm member 50 is secured to the first plate member 22 of lid 20, and the second arm 52 is pivotally secured thereto. In the embodiment pictured in FIGS. 10a and 10b, the first arm member 50 preferably comprises a hollow cylinder 60 having a cut-out 62 (or recess 62) at one end for hingeably receiving the second arm member 52, that is preferably formed as a second cylinder The cut-out 62 defines a structure that comprises a stop lug means or member 63 which arrests any pivotal movement of the second cylinder member 64 (and the associated lip member 56 secured thereto) beyond the stop lug means or member 63. The stop lug means or member 63 allows the filter engaging means 40 to exert a limited force on and/or against the coffee filters 6; preferably a limited force ranging in pressure from about 0.05 lb/sq. in. to about 1.0 lb/sq. in.; more preferably from about 0.2 lb/sq. in. to about 0.7 lb/sq. in.; most preferably about 0.5 lb/sq. in. or less or no more than about ½ lb/sq. in. at any time on the stack of coffee filters 6. This is one of the salient features of the invention, as too much pressure exerted on the innermost coffee filter 7 will rip the filter 7. The filter engaging means 40 may then repetitiously remove a single filter 7 from the stack of filters 6. Because the length required for the filter engaging means 40 to contact one filter changes, preferably about ⅝", from the innermost filter 7 of the stack of filters 6 to the last filter of the stack, the stop lug means or member 63 serves to keep the coffee filter engaging means 40 generally straight, not necessarily perfectly straight, in the process of removing a coffee filter, as shown in FIG. 7, while allowing a certain degree of flexibility. This degree of flexibility is depicted pictorially in FIG. 20, where a first path or trace 100 represents a would be unfettered arc of travel of the teeth 58 (the outermost point of the filter engaging means 40) of the filter engaging means 40, as the first plate member is being lifted by and/or with the simultaneously lifting (or otherwise upward movement of the lid 20, more specifically the first plate member 22). As shown by FIG. 20, the path or trace 100 extends beyond and/or through the second wall member 18 thus necessitating that the filter engaging means 40 comprise an inherent degree of flexibility. A second path or trace 102 marks the path taken by the teeth 58 (again, the outermost edge of the filter engaging means 40) of the filter engaging means 40 as the teeth 58 engage the innermost filter 7. It can be seen that the second path or trace 102 is not a smooth curve due to the change in the state of flex of the filter engaging means 40 for a given moment at any point along the second path or trace 102. Thus, the filter engaging means 40 flexes to avoid ripping the innermost filter 7 and to dynamically adjust to the variance of thickness of the stack of coffee filters 6 as the stack of coffee filters 6 is slowly depleted. As noted before, in reference once again to FIGS. 10a and 10b, the lip member 56 is secured to the second cylinder 64. The first cylinder 60 generally is manufactured from a material that lends an inherent degree of flexibility thereto, such that the stop lug member 63 may possess an inherent degree of flexibility or give. Thus, the spirit and scope of the present invention includes the manufacturing of the coffee filter engaging means 40 with any suitable material that is capable of functioning or performing the purpose of the filter engaging means 40.

Figure 11A:
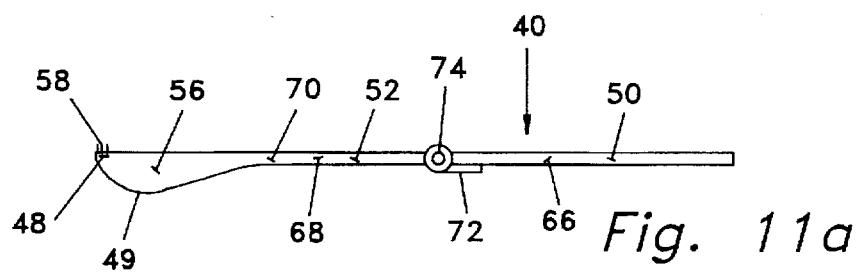
FIG. 11a is a side elevational view of another embodiment of the filter engaging means.
Figure 11B:
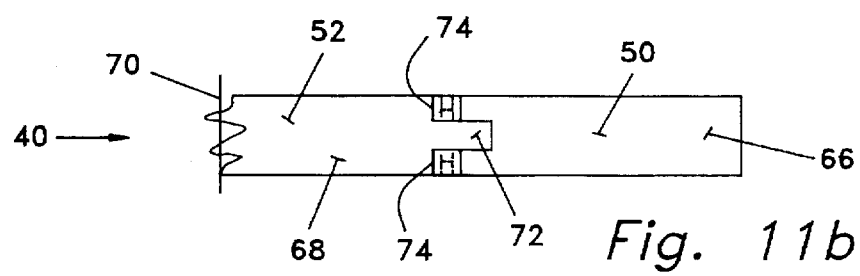
FIG. 11b is a partial bottom plan view of the embodiment of the filter engaging means shown in FIG. 11a disclosing a stop lug member.
Figure 11C:
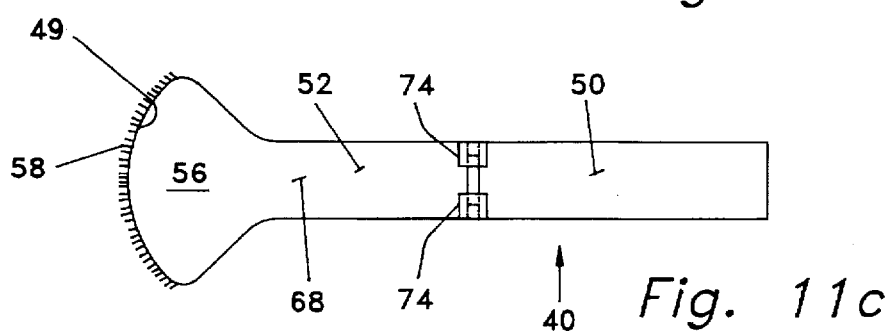
Figure 17A:
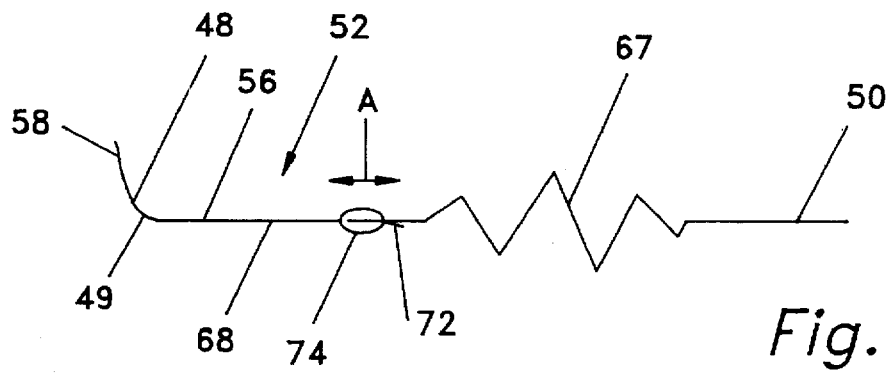
FIG. 17a is side elevational view of yet another embodiment of the filter engaging means of the invention.
Figure 17B:
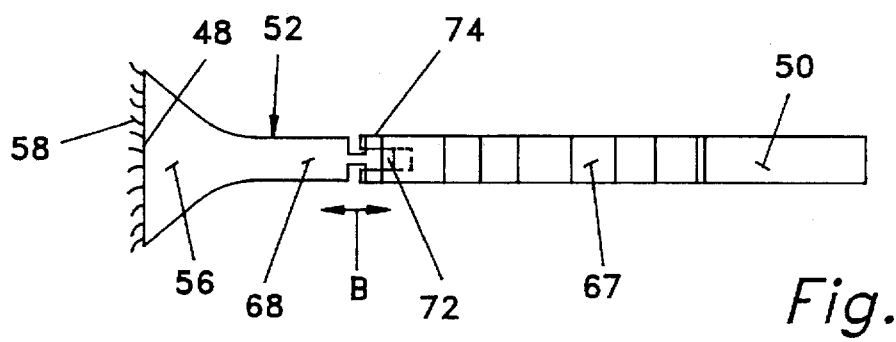

In another embodiment of the coffee filter engaging means 40, pictured in FIGS. 11a, 11b, and 11c, the first arm member 50 and the second arm member 52 are embodied as a first flat plate member 66 and a second flat plate member 68, respectively, wherein the first flat plate member 66 and the second flat plate member 68 are coupled by a hinge member 74 secured to the second flat plate member, and wherein the lip member 56 is formed from (or integrally on) one end 70 of the second flat plate member 68 such that the second arm member 52 and the lip member 56 form one generally continuous piece. As best shown in FIGS. 11a and 11b, the hinge member 74 defines a structure comprising a stop lug member 72 formed therefrom, to arrest any pivotal movement of the second flat plate member 68 past the stop lug member 72. In this embodiment, the material used in constructing the first flat plate member 66 and the second flat plate member 68 comprises an inherent degree of flexibility, such as plastic or metal. In the case of the latter, as shown in FIG. 17, the first flat plate member 66 may be replaced by a corrugated plate member 67. The corrugated plate member 67 is generally constructed from metal, but may be formed from any other equally suitable material, such as a soft plastic, etc. The corrugated plate member 67 serves to increase the amount of flexibility obtained by the filter engaging means 40. It should be noted that the hinge member 74 may have a certain degree of longitudinal play. Stated alternatively, the hinge member 74, as shown in FIG. 17a and 17b, may allow the second arm member 52 to slide relative to the first arm member 50 (shown by the arrows A and B), further providing an allowance for different thicknesses of filters.

Figure 10B:
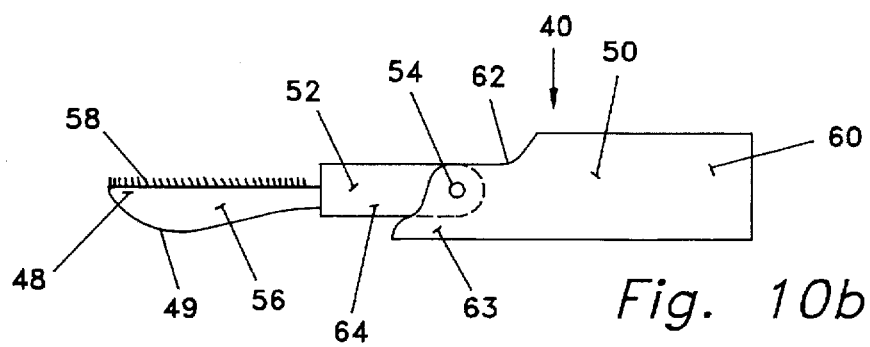
Figure 18A:
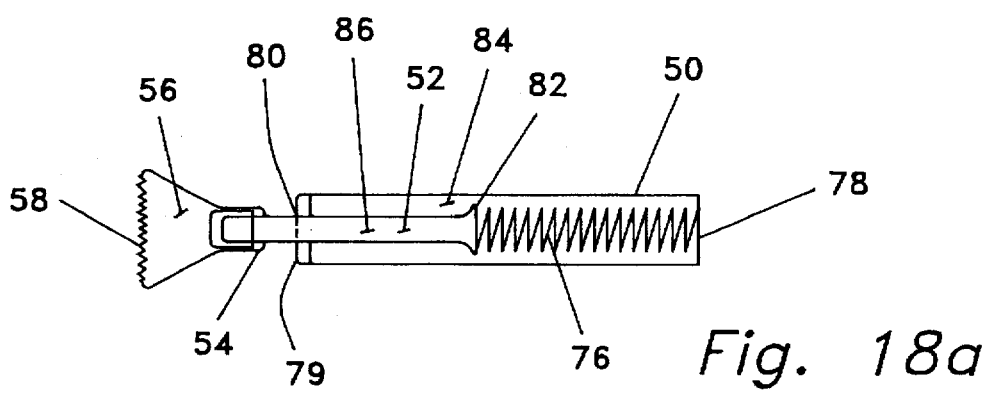
FIG. 18a is a top plan view of still another embodiment of the filter engaging means of the invention.
Figure 18B:
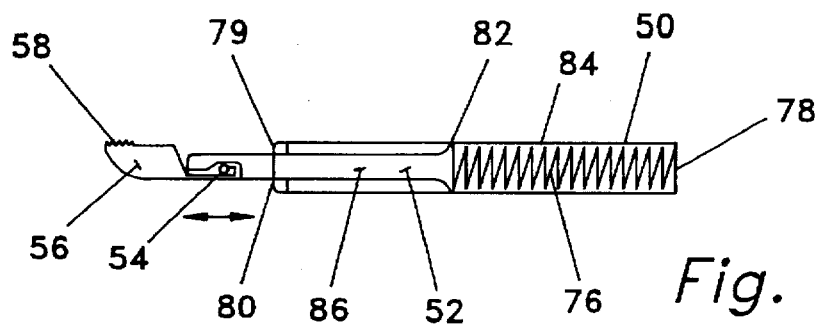

In yet another embodiment of the coffee filter engaging means 40, as seen in FIGS. 18a and 18b, the filter engaging means 40 of FIGS. 10a and 10b may comprise a spring member 76 disposed in a first cylinder member 84 (see FIGS. 18a and 18b). A second cylinder member 86 is slidably disposed in the first cylinder member 84 (rather than hingeably secured thereto, as with first cylinder 6 and second cylinder 64 in FIGS. 10a and 10b) such that spring member 76 biases the second cylinder member 86 outwardly and/or away from the first cylinder member 84. As shown in FIG. 18a, the first cylinder member 84 comprises a first end 78 and a second end 79. The second end 79 of the first cylinder member 84 in this embodiment comprises an aperture 88 wherethrough the second cylinder member 86 may slidably pass. Additionally, the second cylinder member 86 comprises a first flared or flanged end 82. The first flared or flanged end 82 of the second cylinder member 86 slides within the first cylinder member 84 such that the spring member 76 engages and/or is sandwiched between the first flared or flanged end 82 of the second cylinder member 86 and the first end 78 of the first cylinder 84. Obviously and preferably, the flanged end 82 has a larger diameter than the diameter of aperture 80. The lip member 56 may be secured to the second cylinder member 86 by any suitable means, such as by any of means or embodiments previously described, such as in the embodiment, as shown in FIGS. 10a and 10b. Preferably for the embodiment shown in FIGS. 18a and 18b, the lip member 56 may be hingeably secured to the second cylinder member 86 by hinge member 54. Additionally, it can be appreciated that the spring member 76 may or may not be utilized without affecting the operation of the invention. As previously indicated the first flared end 82 of the second cylinder prevents the second cylinder 86 from separating entirely from the first cylinder 84, as the flared end 82 will not pass through aperture 80. Thus in this embodiment of FIGS. 18a and 18b, the second arm member 52 may be slidably coupled to the first arm member 50. Further, the lip member 56 may be hingeably secured to the second arm member 52, wherein the lip member 56 comprises the stop lug member 63 as discussed above. Further yet, the lip member 56 may be secured to the second arm member 52, such that the lip member 56 does not pivot relative to the second arm member 52.

Figure 14:
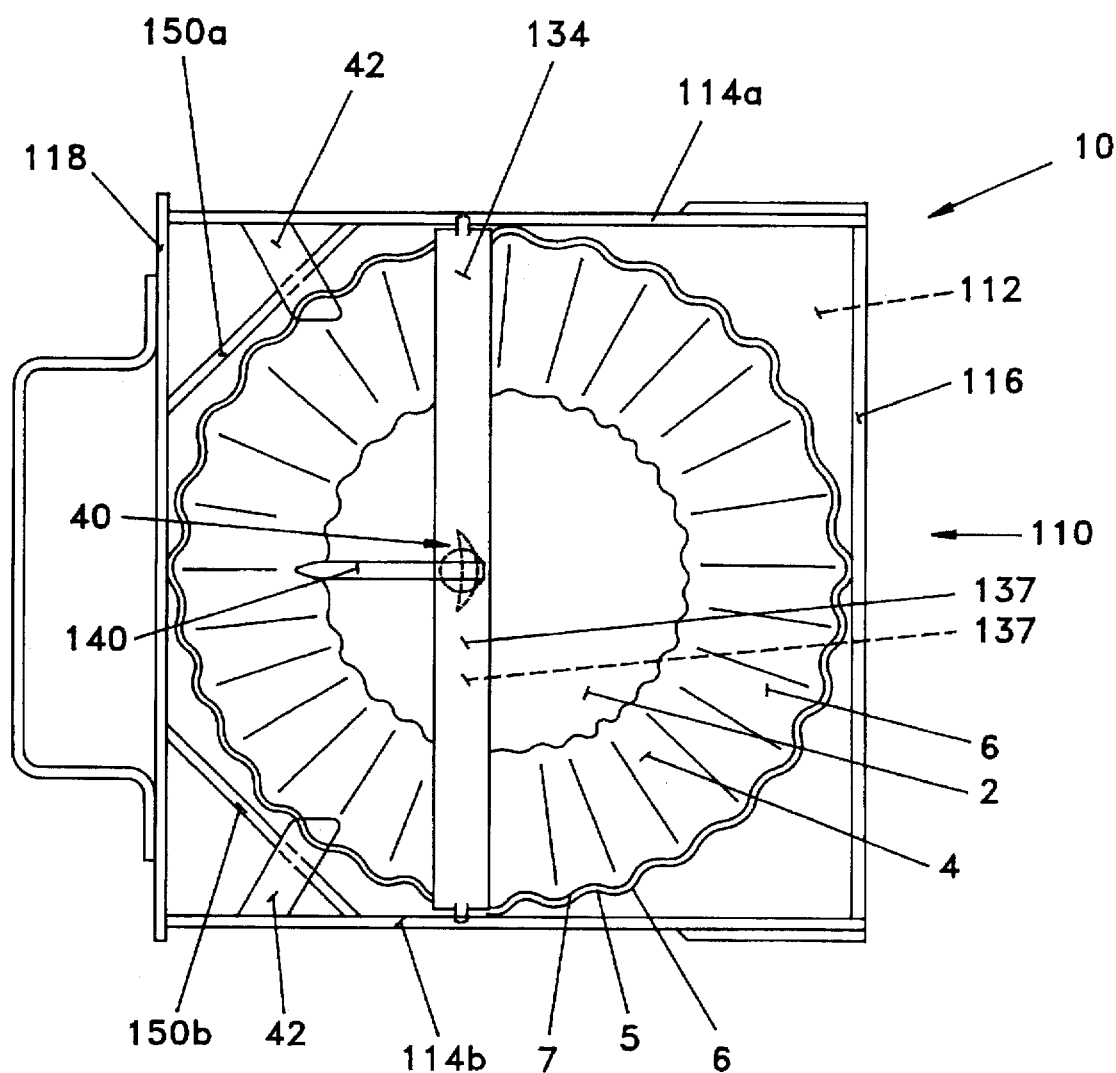
FIG. 14 is a top plan view of another embodiment of the invention, in the form of a drawer that may slide into any suitable opening of a drawer housing and having a bar that is rotatably secured to the sides of the drawer such that when the drawer is pulled out, the inner face of the drawer housing contacts a lever causing the latter to engage a coffee filter and remove same from drawer through or between a pair of stops.
Figure 15:
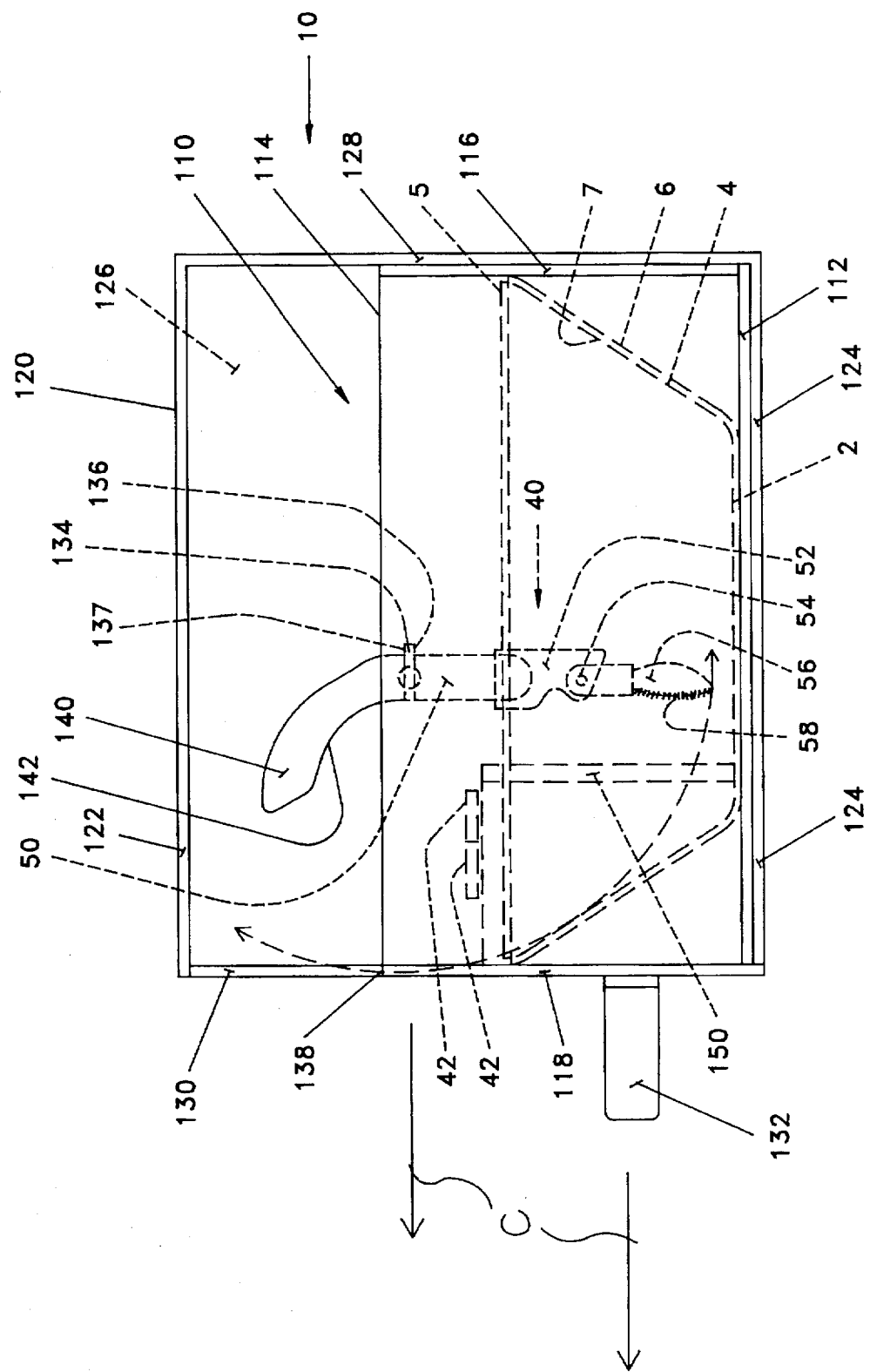
FIG. 15 is a side elevational view of the embodiment of the invention depicted in FIG. 14.
Figure 15A:
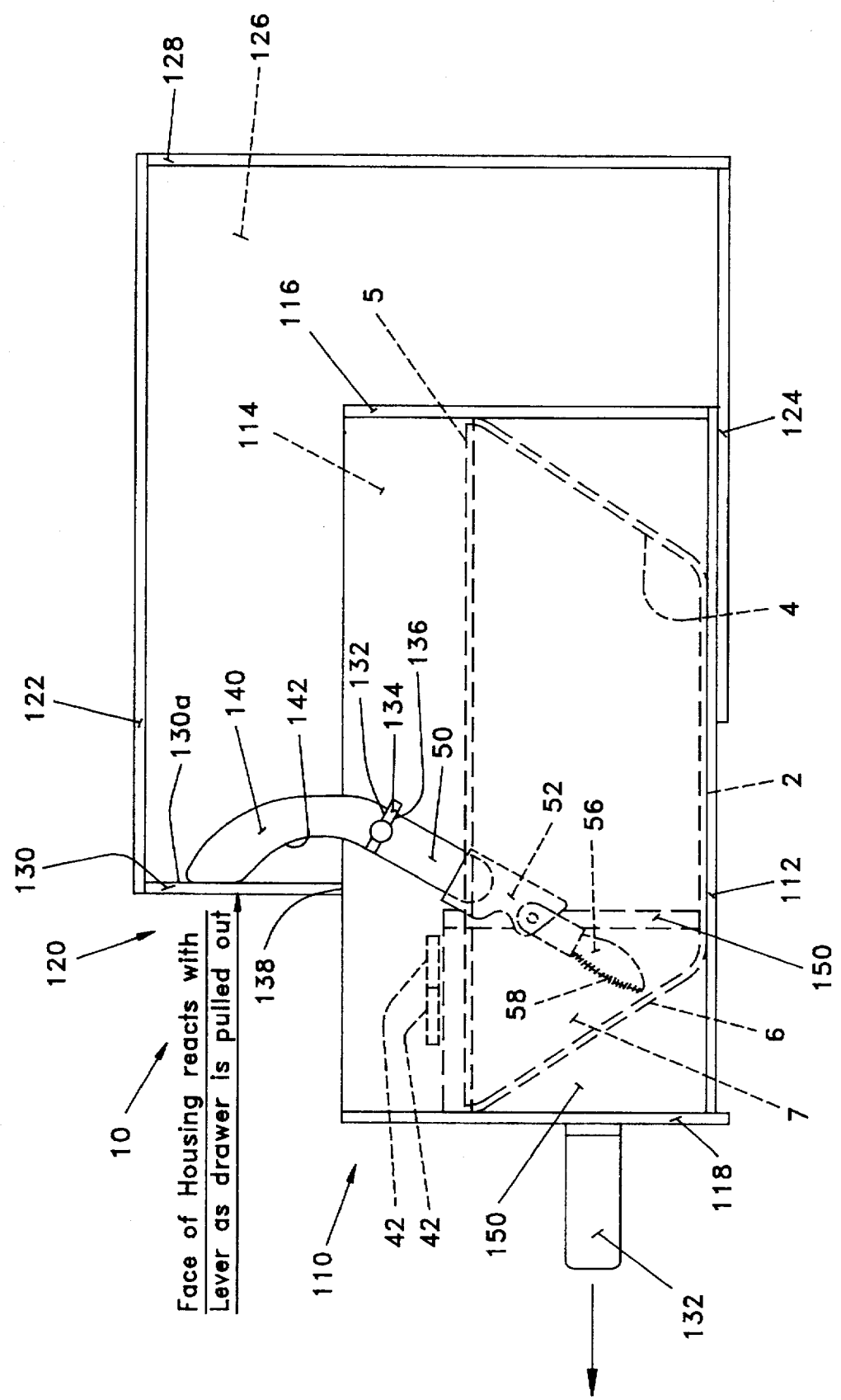
FIG. 15a is a side elevational view of the embodiment shown in FIG. 14 with the drawer partially pulled open and disclosing the lever contacting the inner face of the drawer housing and thereby causing the same to engage a single coffee filter.
Figure 15B:
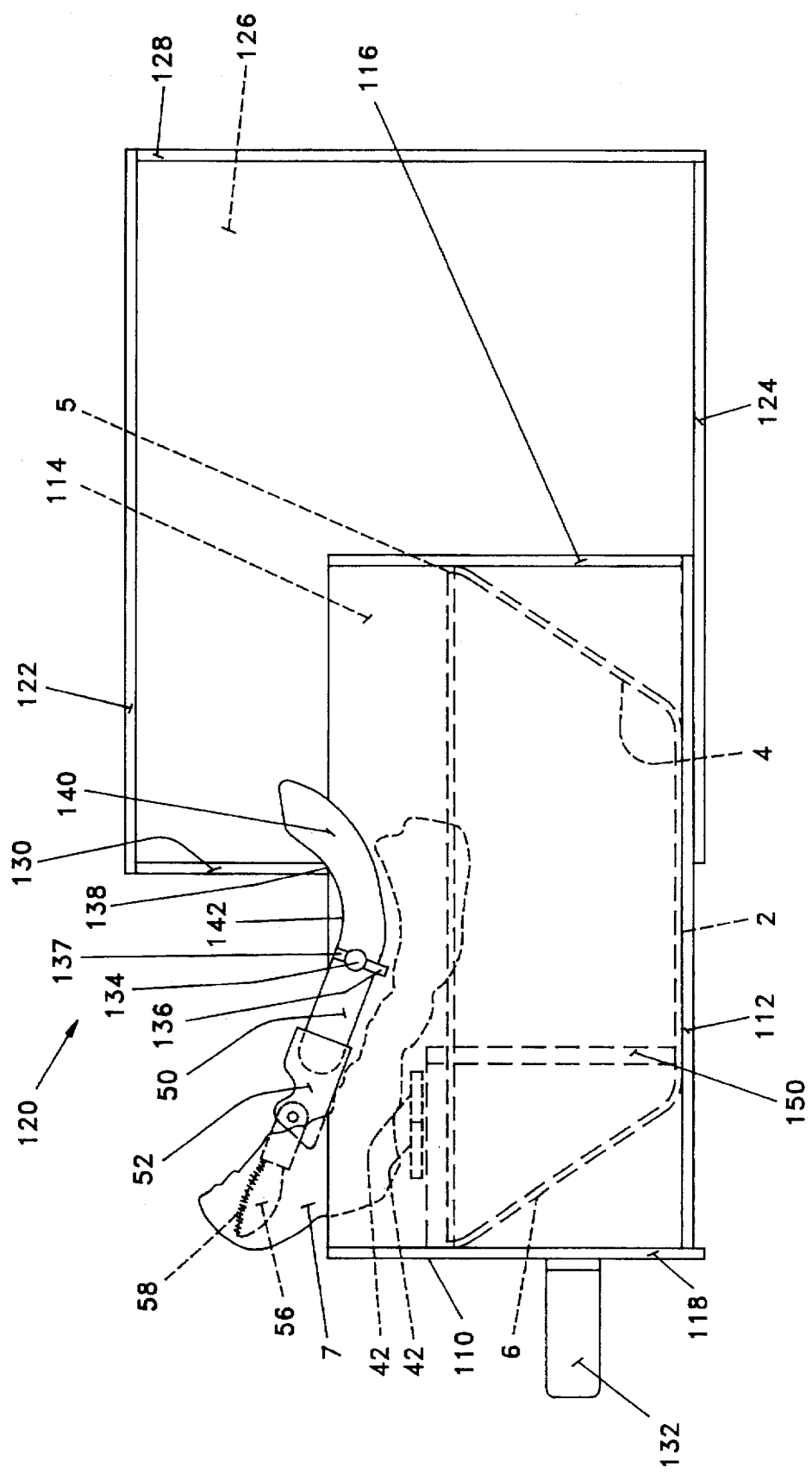
FIG. 15b is a side elevational view of the embodiment shown in FIG. 14 with the drawer pulled open and disclosing a contour of the lever contacting the inner face of the housing and thereby causing the same to pull the single coffee filter between the pair of stops.
Figure 16:
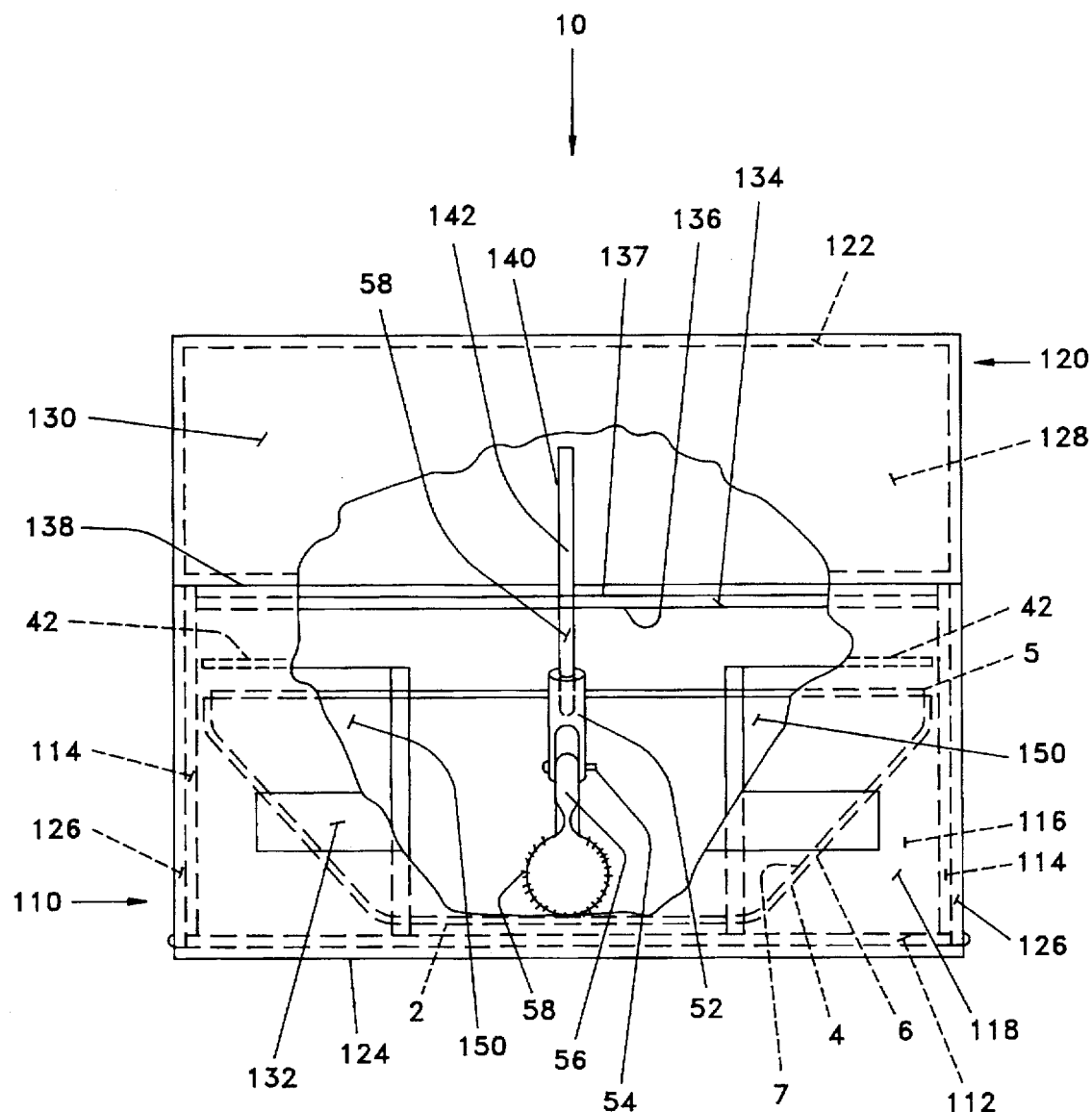
FIG. 16 is a partial cut-away front elevational view of the invention depicted in FIG. 14.

It can be appreciated that the coffee filter container and/or dispenser 10 may be embodied or manifested in a number of embodiments. Referring therefore to FIGS. 14–16, and in particular to FIG. 14, for an alternate embodiment of the invention, there is seen the coffee filter container and/or dispenser 10 of the invention embodied in a drawer member 110 generally illustrated as 110. The drawer member 110 comprises a bottom 112, a pair of opposed side wall members 114—114 secured to the bottom 112, a rear wall member 116 secured to the bottom 112 and to the side wall members 114—114, and a front wall member 118 secured to the side wall members 114—114 and to the bottom 112. The drawer member 110 may be disposed in any suitable drawer housing member (see FIG. 15) 120 comprising a top 122, a bottom 124, and a pair of opposed side wall members 126—126 secured to the top 122 and to the bottom 124. A rear wall member 128 is secured to the top 122, to the bottom 124, and to the side wall members 126—126, and a front partition member 130 is secured to the top 122 and to the side wall members 126—126. It is understood that the drawer housing 120 may be any suitable drawer recess or housing, and that it is not an intent of this invention to redefine a drawer housing; rather it is an intent to provide a drawer and drawer housing combination for dispensing coffee filters 6, or to provide a retro-fit for an existing drawer and drawer housing (such as in a kitchen) to the present invention. Therefore, the present invention may comprise the drawer 110 and drawer housing 120 as shown in FIG. 15, or the invention may be added to an existing drawer and drawer housing. As shown in FIG. 15, the drawer member 110 is slidably disposed in the drawer housing member 12e such that the drawer may be slidably pulled by a handle member 132, or the like, in the operation of the invention. As best shown in FIG. 14, a bar member 134 is rotatably or pivotally secured to the opposed side wall members 114—114, such that the bar member 134 is situated above the stack of coffee filters 6 that is to be disposed therein and the coffee filter engaging means 40 that is secured to a bottom face 136 of the bar member 134 (see FIG. 15). A lever member 140 is secured to a top face 137 of the bar member 132. As shown in FIG. 15, the lever member 140 comprises a shape that is curved towards the front wall member 118 of the drawer member 110. As the drawer member 110 is pulled from the drawer housing 120, the lever member 140 reacts with an inner surface 30a of the front partition member 130 and an edge 138 of the front partition member 130. It should be understood that the lever member 140 may comprise any shape that reacts with the inner surface 130a and the edge 138 of the partition member 130 and/or fully in combination therewith, as shown in FIGS. 15a and 15b and does not snag the stack of coffee filters 6 usually contained in the drawer member 138. As shown in FIGS. 15a and 15b, the lever member 140 preferably comprises an inner edge 142 which defines a structure that is arcuate in shape. The curvature of the inner edge 142 of the lever member 140 frictionally follows the edge 138 of the partition member 130 as the drawer member 110 is pulled outward (in the direction of the arrows C in FIG. 15) from the drawer housing member 120. As in the previous embodiments, this embodiment of the invention comprises stop members 42—42 which are secured to the opposed side wall members 114—114 of the drawer member 110 (see FIG. 14). Additionally, a pair of side support members 150—150 (or partition members) are secured to the drawer member 110. The side support members 150a–150b (see FIG. 14) are each secured to the front wall 118 of the drawer member 110 and to the opposed side wall members 114a–114b, to provide additional support to the stack of coffee filters 6 and to facilitate the channeling of the coffee filters 6 through the stop members 42—42 by the filter engaging means 40 for this embodiment.

Figure 9:
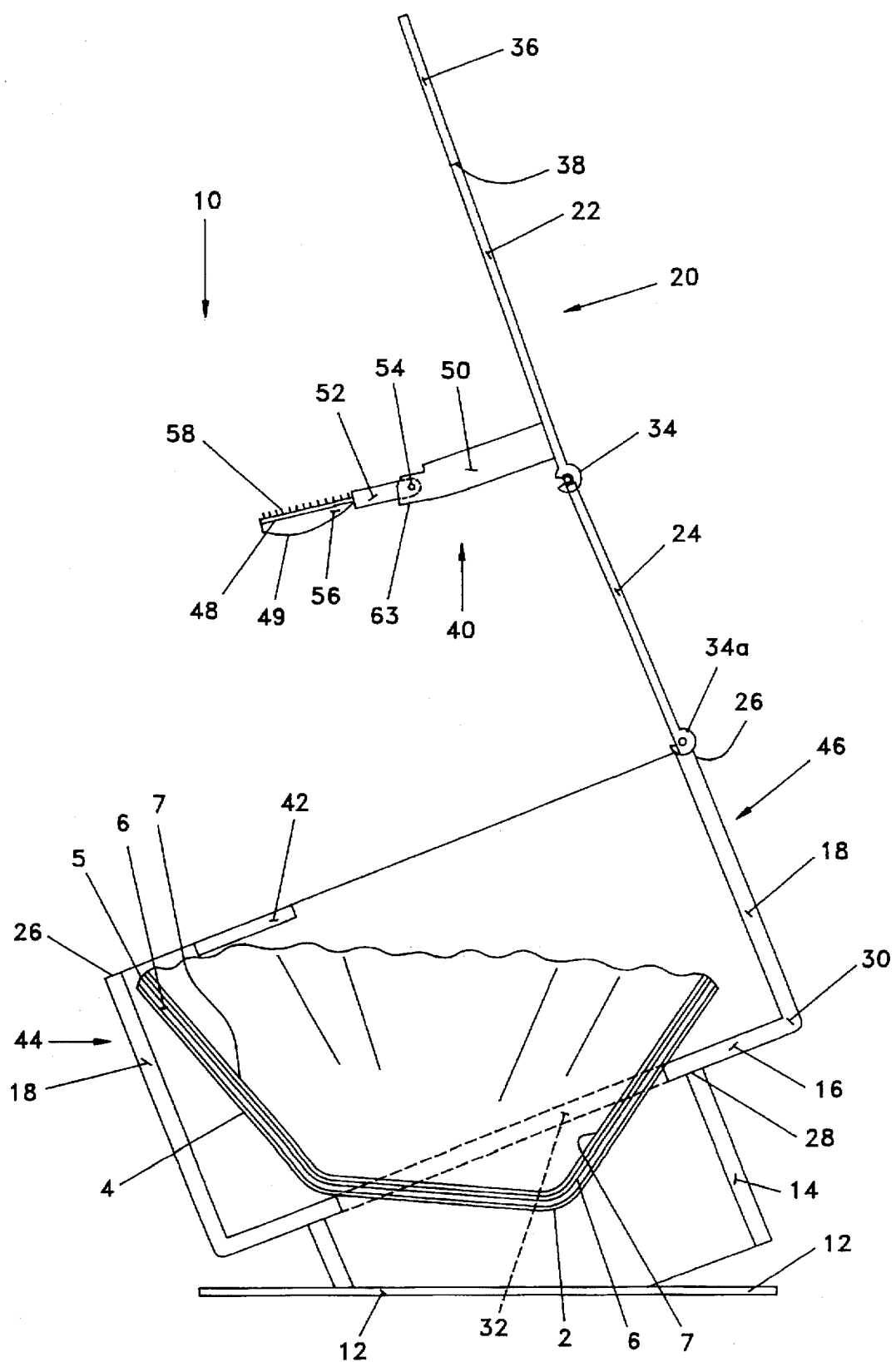
FIG. 9 is a side cutaway view of the coffee filter container and/or dispenser of the invention with the coffee filters disposed therein and having the lid fully open.
Figure 12:
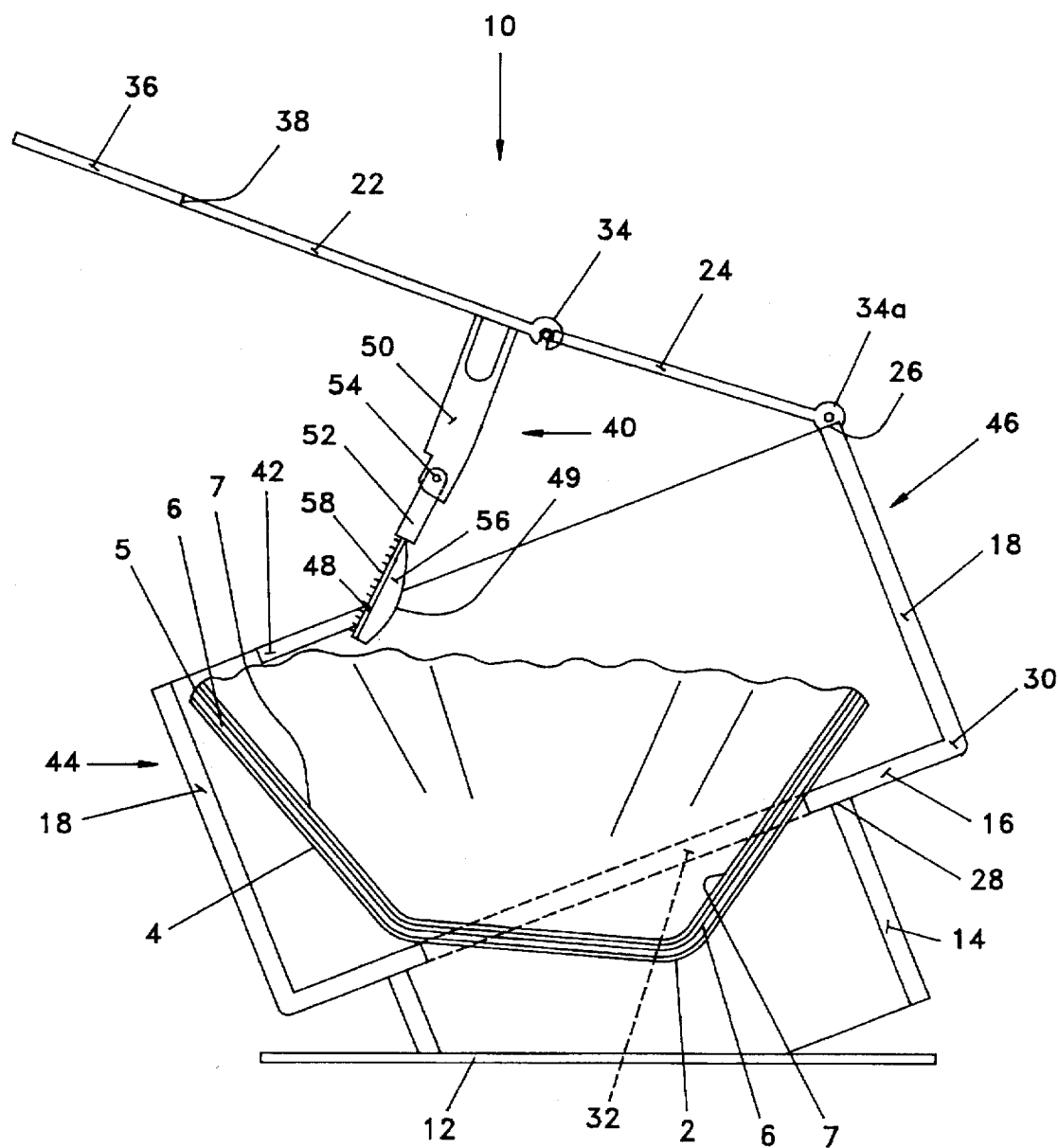
FIG. 12 is a side cutaway view of the coffee filter container and/or dispenser of the invention with the coffee filters disposed therein and having the entire lid partially open.
Figure 13:
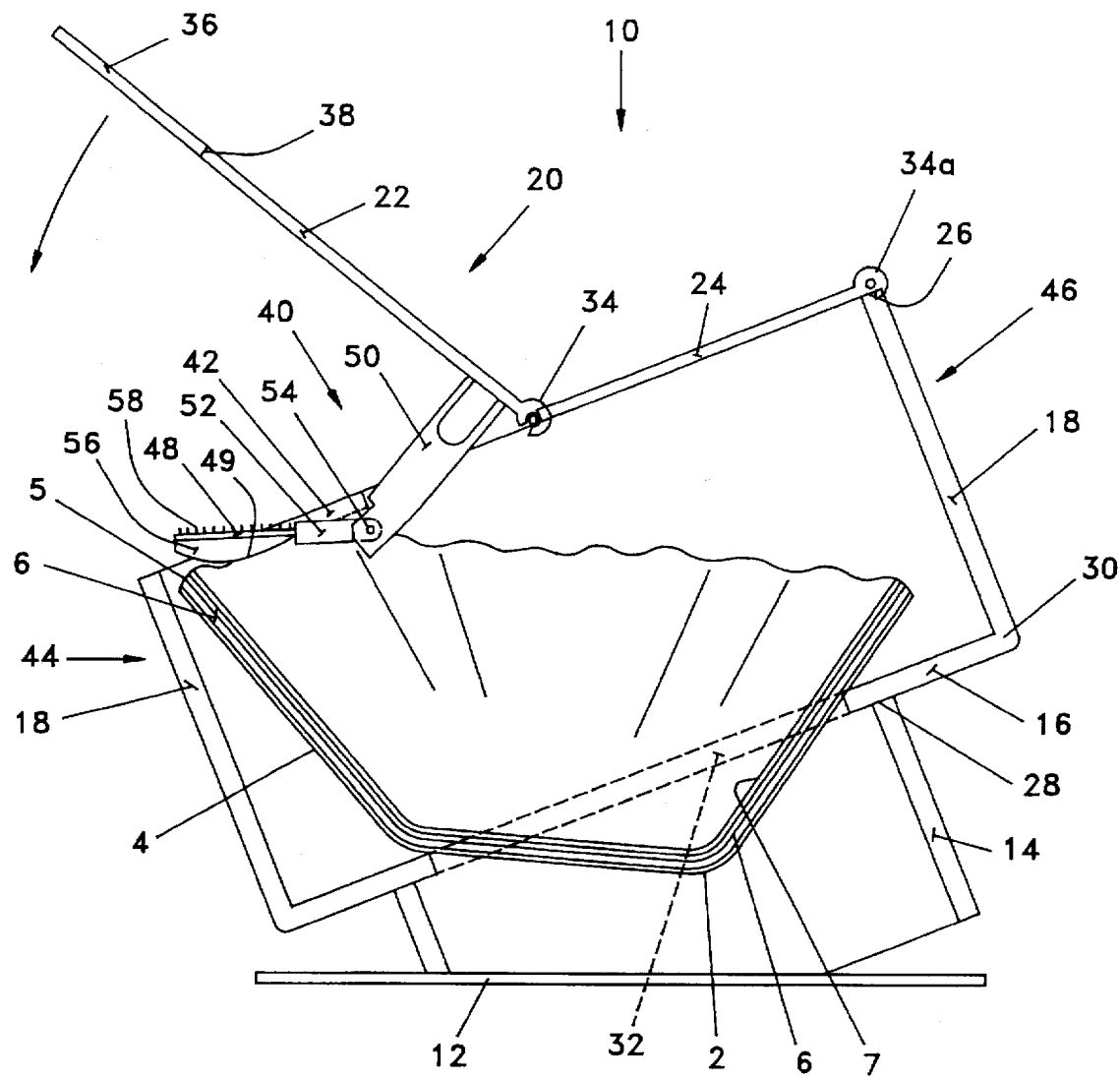
FIG. 13 is a side cutaway view of the coffee filter container and/or dispenser of the invention with the coffee filters disposed therein, and having the first plate of the lid partially closed, and disclosing the filter engaging member bending at a hinge to avoid engaging the coffee filters contained therein.

With continuing reference to the drawings for the operation of the invention, there is seen in FIG. 9 the coffee filter container and/or dispenser 10 with the lid member 20 having been opened fully, thereby revealing the inside of the coffee filter container and/or dispenser 10. A stack or plurality of coffee filters 6 is disposed in the coffee filter container and/or dispenser 10 such that the bottom 2 of the stack of coffee filters 6 is generally parallel to the base 12 of the coffee filter container and/or dispenser 10, and such that the circular wall 4 of the stack of coffee filters 6 is generally parallel to the side wall member 18. As previously mentioned, a portion of the stack of coffee filters 6 preferably passes through aperture 32 such that the stack of coffee filters 6 are generally horizontally disposed. The lid member 20 is then closed by lowering the lid member 20. As depicted in FIG. 12, the coffee filter engaging means 40 does not contact the filters 7 as lid member 20 is closed, thereby avoiding any damage to the filters contained in the coffee filter container and/or dispenser 10. Once the lid member 20 is in the closed position, as shown in FIG. 6, a coffee filter 7 may be removed from the stack of coffee filters 6, by lifting on the lip member 36 secured to the first plate member 22 of lid member 22, and thereby opening the first plate member 22, while leaving the second plate member 24 in the closed position (see FIG. 7). By opening the first plate member 22 only, the coffee filter engaging means 40 swingably engages the innermost coffee filter 7. As first plate member 22 is further lifted, the coffee filter engaging means 40 pulls the innermost filter 7 upwards and the stack of filters 6 which are frictionally engaged thereto, towards the front half 44 of the second wall member 18. Further upward movement of the stack of filters 6 is arrested by stop members 42—42 (see FIG. 5). As shown in FIG. 8, the innermost filter 7 is subsequently pulled away from the stack of filters 6, past and/or through the stop members 42—42. A single filter 7 does not have enough rigidity to hold against stop member 42 and cannot resist the upward pull of the filter engaging means 40. The filter 7 thus produced is removed from the coffee filter engaging means 40. The first plate member 22 is subsequently lowered. As the first plate member 22 is lowered, the second arm member 52 of the coffee filter engaging means 40 pivots as shown in FIG. 13, such that the teeth 58 of the coffee filter engaging means 40 do not snag the stack of filters 7 contained in the coffee filter container and/or dispenser. The bottom edge 49 of the lip member 56 is smooth, such that it slidably passes over the stack of filters 6. The embodiment of the coffee filter container and/or dispenser shown in FIGS. 14—16 works on the same principle, with a minute change in the modus operandi; the filter engaging means 40 as described in the preceding description of operation is not operated by lifting on a lid, rather it is operated by pulling on the handle member 132 of drawer member 110, as shown in FIGS. 15, 15a, and 15b. Referring then to FIG. 15 for use of another embodiment of the invention, drawer member 110 is opened (ie pulled out of drawer housing member 120), the stack of coffee filters 6 is disposed therein, and the drawer member 110 is closed to prepare the coffee filter container and/or dispenser for containing and/or dispensing coffee filters. A single coffee filter 7 is to be engaged and pulled from the coffee filter container and/or dispenser by the filter engaging means 40 in the normal course of operation (see FIG. 15b). The drawer member 110 is subsequently pulled open by handle member 132 away from the drawer housing member 120. As shown in FIG. 15a, as the drawer member 110 is pulled open in the direction of the arrow, the lever member 140, the bar member 134, and the filter engaging means begin to pivot due to the action of lever member 140 against the front partition member 130. The action of lever member 140 against the front partition member 130 causes the filter engaging means 40 to pivot forward and engages the innermost coffee filter 7 contained in the drawer member 110. The filter engaging means 40 pulls the stack of coffee filters 6 forward such that the stack of coffee filters 6 engages the side support member(s) 150—150. As shown in FIG. 15b, as the drawer member 110 is further pulled forward, the contour of the inner edge 142 of the lever member 140 frictionally follows the edge of the front partition member of the drawer housing member 120, causing the stack of coffee filters 6 to be pulled upwards and against the stop member(s) 42—42. The innermost coffee filter 7 is frictionally released from the stack of coffee filters 6 by the opposing forces of the stop member(s) 42—42 and is passed through or between the stop members 42—42 by the filter engaging means 40. Thus, a single coffee filter 7 is separated and dispensed from the coffee filter container and/or dispenser 10.

In a more preferred embodiment of the present invention, as best depicted by FIGS. 22–30, there is seen another alternative embodiment of the coffee filter container and/or dispenser of the invention, generally illustrated as 200. The filter container 200 generally comprises a generally elliptical base 202, a generally cylindrical side wall member 204 secured perimetrically to the base 202, and a top assembly 206 perimetrically coupled to the cylindrical wall member 204. An alternative embodiment of the filter engaging means 40, generally illustrated as 208, is coupled to the top assembly 206.

Figure 24:
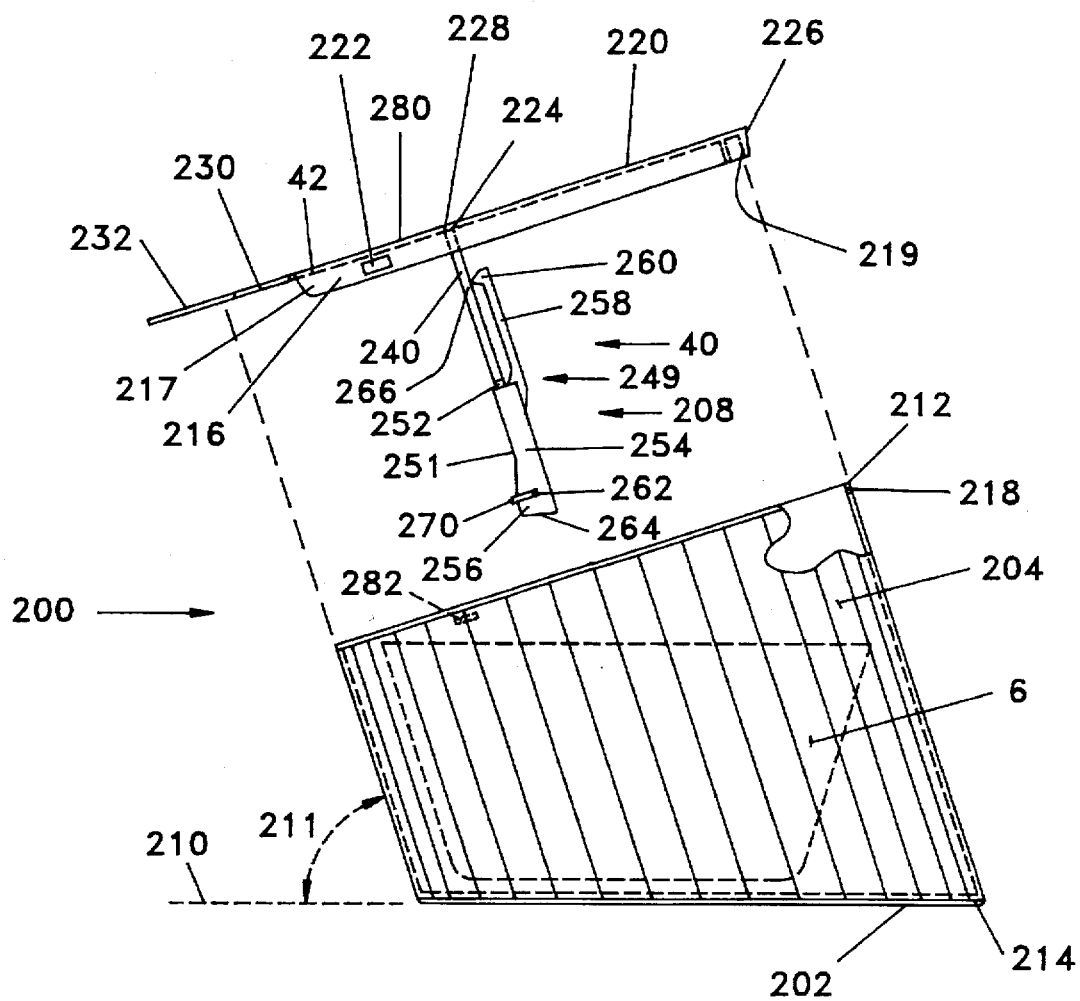
FIG. 24 is an exploded side elevational view of the coffee filter container and/or dispenser of FIG. 22 having the lid member removed from the housing container and disclosing the filter engaging means.

The base 202 of the coffee filter dispenser and/or container 200, as previously mentioned is perimetrically secured to the side wall member 204. As shown in FIG. 24, the cylindrical side wall member 204 is angularly disposed relative to a horizontal plane 210, such that an angle 211 is formed between the side wall member 204 and the horizontal plane 210. Preferably, the angle 211 measures from about 60 degrees to about 85 degrees, more preferably from about 70 degrees to about 80 degrees, most preferably about 75 degrees. The base 202, as may be evident from FIG. 24, lies in plane 210, such that the angle 211 is formed between the side wall member 204 and the base 202. The side wall member 204 terminates in a perimetrical top edge 212 which is normal to the side wall member 204, or such that the top edge 212 is square relative to the side wall 204. Stated alternatively, a bottom edge 214 of the side wall member 204 is angularly inclined relative to the side wall member 204 such that the base 204 may be secured thereto since, as it can be appreciated, the angular disposition of the side wall 204 to the base 202 necessitates that the bottom edge 214 comprises the same angular disposition. However, as mentioned, the top edge 212 of the side wall 204 is normal, such that the top assembly 206 is generally circular, rather than elliptical.

Figure 4:
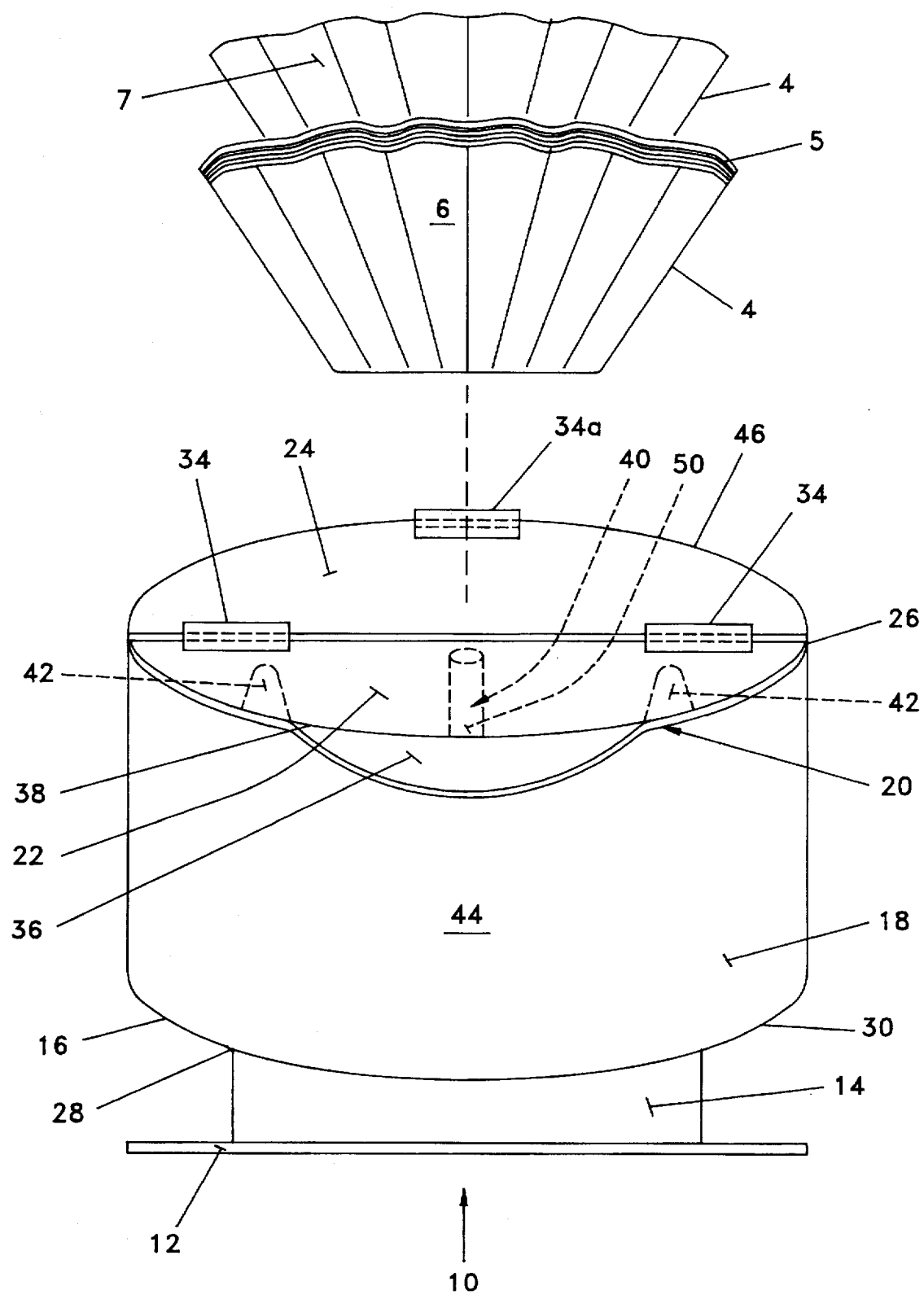
FIG. 4 is a front perspective view of the coffee filter container and/or dispenser of the invention with the coffee filters removed therefrom.
Figures 22, 22A, 22B:
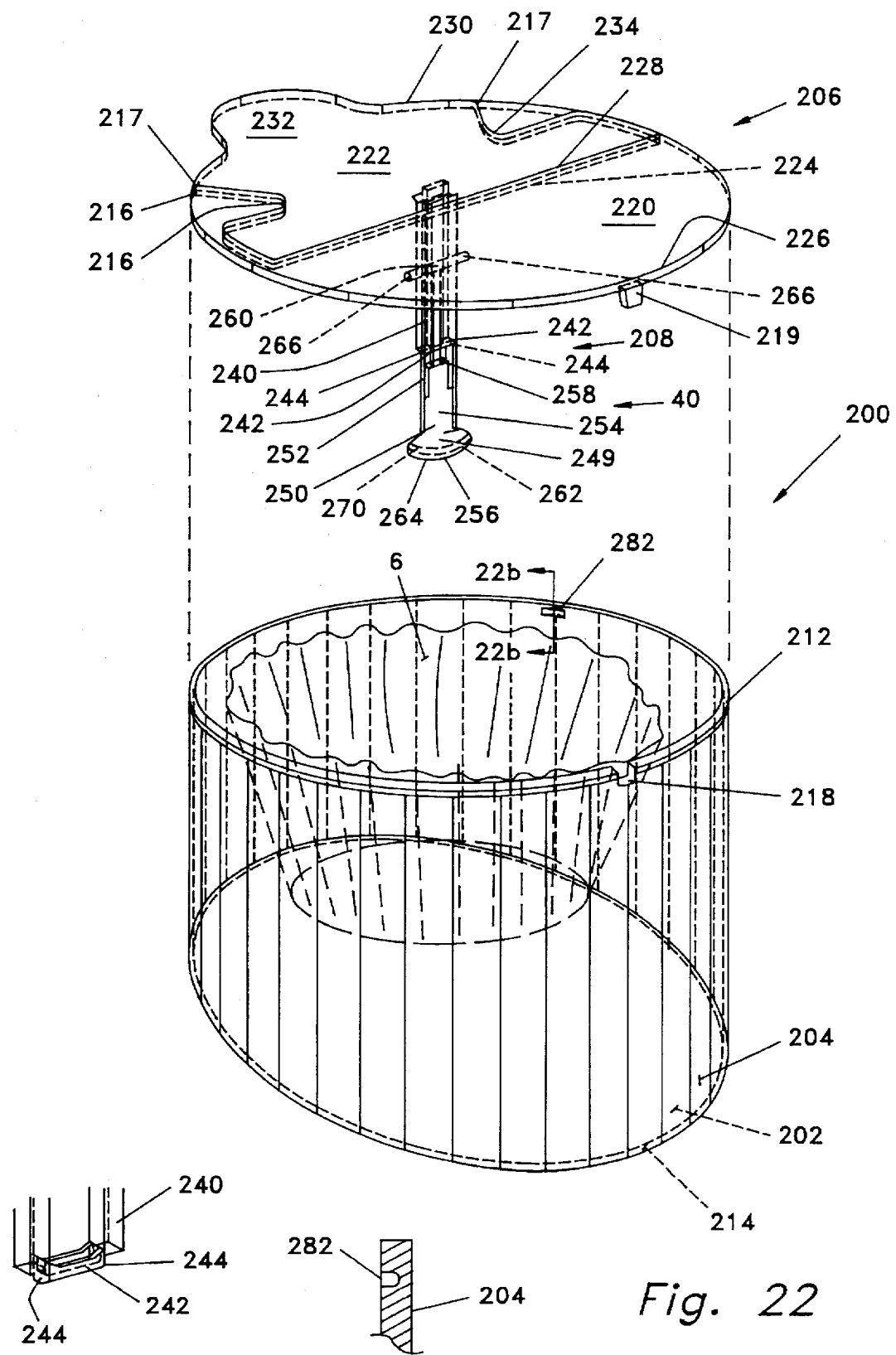
FIG. 22 is a perspective view of an alternative embodiment of the coffee filter container and/or dispenser, having the lid member removed from the housing container, and disclosing an alternative embodiment of the filter engaging means.
FIG. 22A is a partial perspective view of an end of the embodiment of the first arm member of FIG. 22.
FIG. 22B is a vertical sectional view taken in direction of the arrows and along the plane of line 22B—22B in FIG. 22.
Figure 23A:
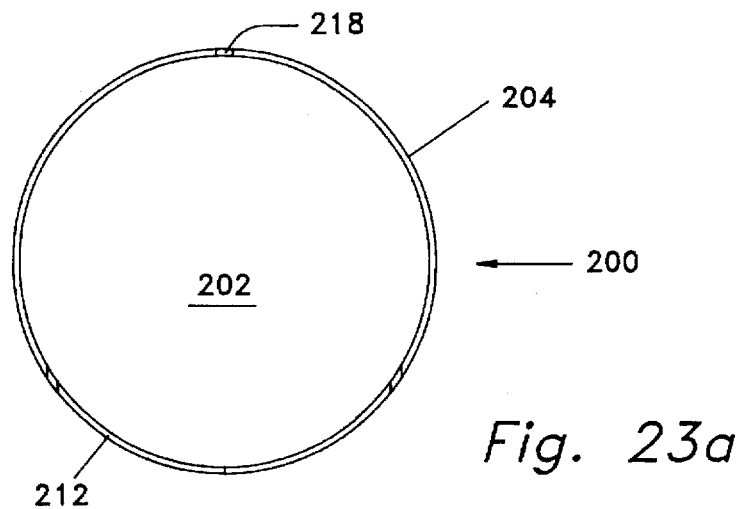
FIG. 23A is a top plan of the housing container of the coffee filter container and/or dispenser of FIG. 22 having the lid member removed therefrom.
Figure 23B:
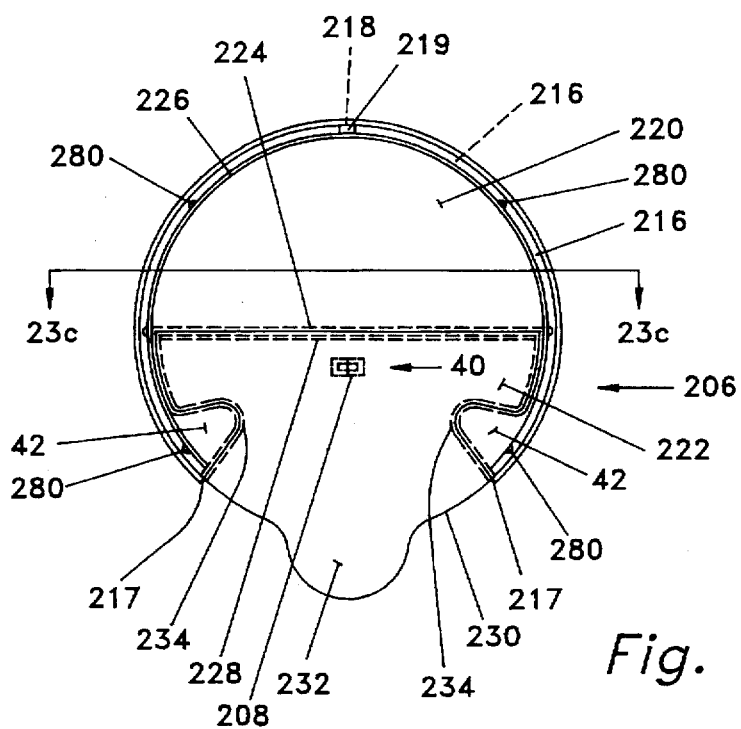
FIG. 23B is a top plan view of the lid member of the coffee filter container and/or dispenser of FIG. 22.
Figure 23C:
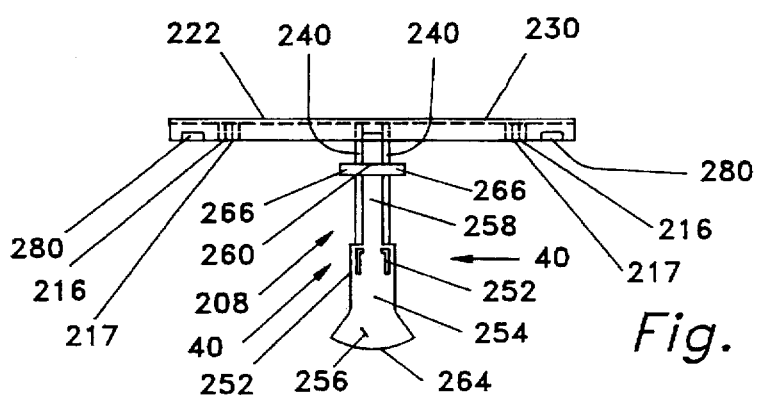
FIG. 23C is a vertical sectional view taken in direction of the arrows and along the plane of line 23C—23C in FIG. 23B.
Figure 25:
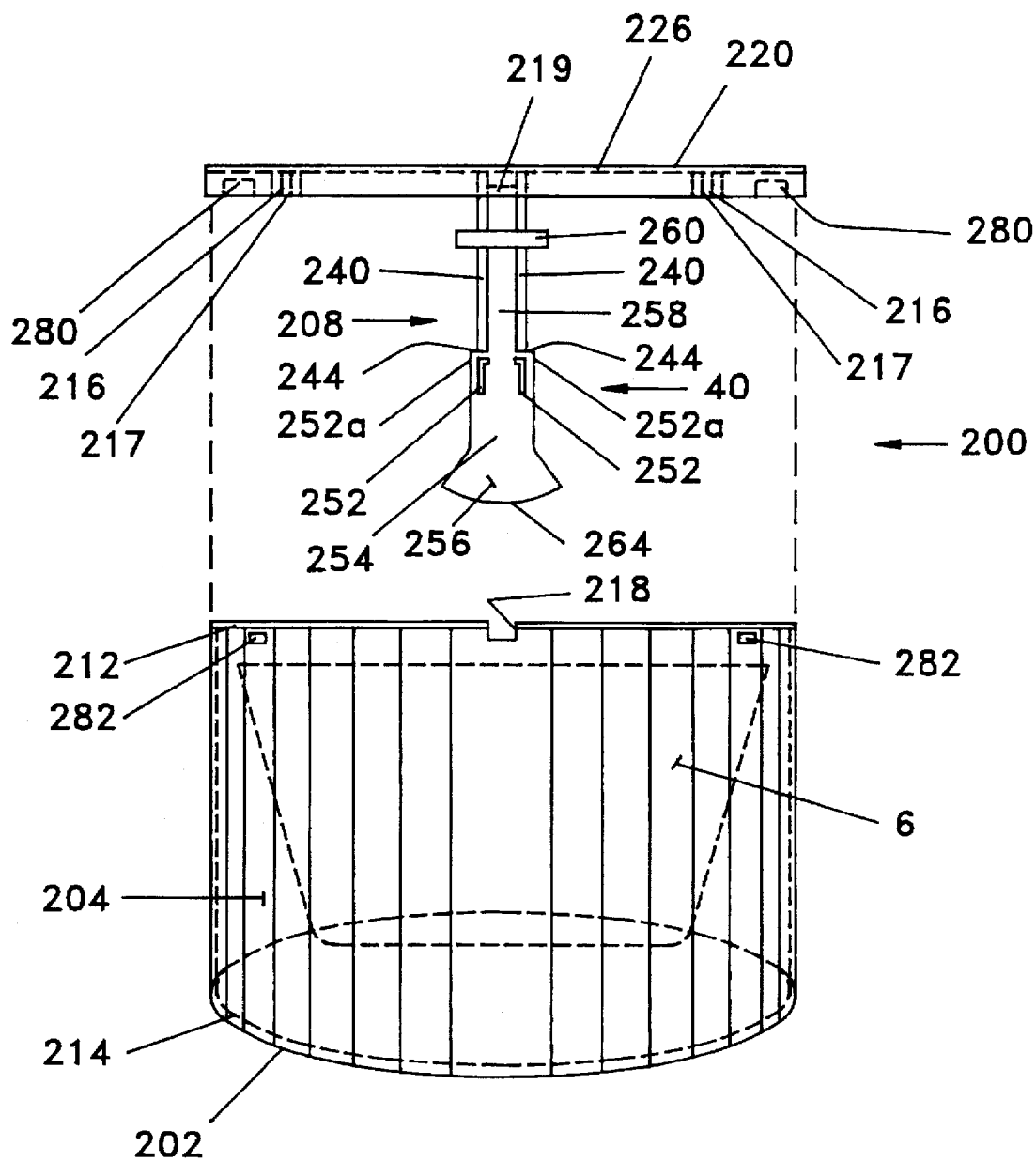
FIG. 25 is an exploded rear elevational view of the coffee filter container and/or dispenser of FIG. 22 having the lid member removed from the housing container and disclosing the filter engaging means.
Figure 26:
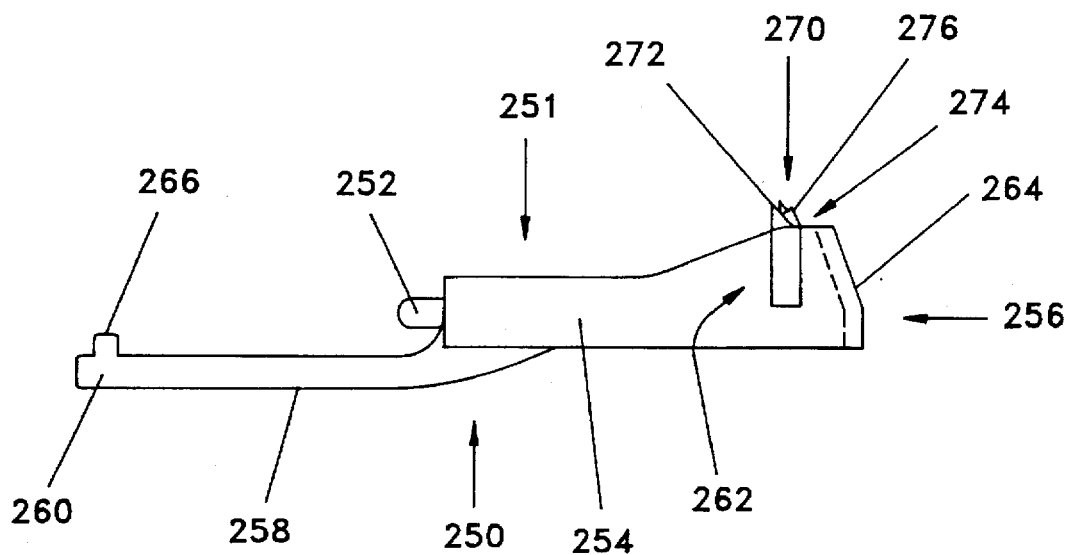
FIG. 26 is a side elevational view of the second arm member of the filter engaging means of FIG. 22.
Figure 31:
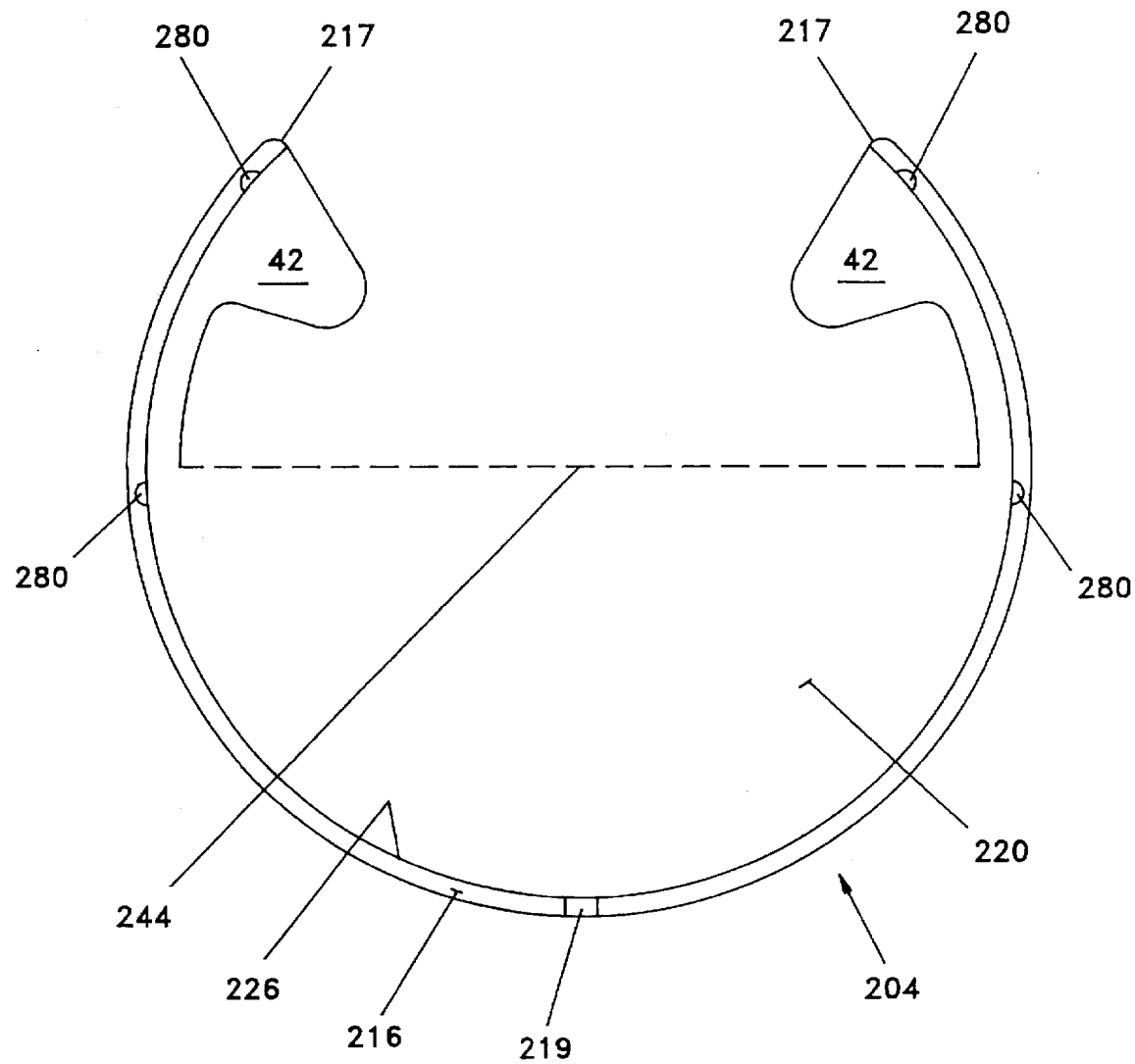
FIG. 31 is a bottom plan view of the lid member removed from the coffee filter container and/or dispenser having a pivotally disposed plate member removed and disclosing a lug member and a plurality of nipple members.

The top assembly 206, as previously mentioned, is generally circular. As best shown in FIG. 23B and 24, the top assembly 206 defines a perimetric, generally U-shaped lid channel 216 adapted for receiving the top edge 212 of the side wall member 204 to effectively couple the top assembly 206 to the side wall member 204. A lug 220 is formed in the channel 216 for aligning the top assembly 206 to the side wall member 204. As seen in FIG. 25, the side wall member 204 has a recess 208 disposed therein for receiving the lug 219 as the top assembly 206 is disposed on the side wall member 204. The lid channel 216 has two opposed ends 217—217 terminating in a pair of opposed stop members 42—42 which are secured to or formed from the top of the channel 216. The stop members 42—42 as mentioned in the preceding for the previous embodiments, typically comprise a structure that is generally triangular and are functionally identical to the stop members 42—42 in FIG. 4. As seen in FIG. 32B, the lid channel 216 terminates in ends 217—217 prior to completing a complete circle, such that the lid channel 216 defines a structure that is generally C-shaped. A plurality of nipple members 280 (see FIG. 31) is disposed in the channel 206 such that the nipple members 280 are generally secured to an innermost wall. The nipple members 280 are adapted for being received by a corresponding plurality of nipple recesses 282 disposed in the circular wall member 204, as shown in FIG. 22B. The nipple 288 frictionally engage the nipple recesses 282 to removably secure the top assembly 206 to the circular wall 206

As best shown in FIG. 23B, the top assembly defines a pair of opposed, generally semi-circular plate members 220–222. The semi-circular plate member 220 defines a structure that is generally D-shaped, comprising a semi-circular edge 226 and a flat edge 224. The plate member 220 is secured to or formed from the lid channel 216 such that the flat edge 224 (i.e. the straight line of the "D") is generally opposite the lug 219 of the lid channel 216, or such that the lug 219 is typically equispaced along the semi circular edge 226 of the plate member 220. The semi-circular plate member 222 defines a structure that is generally D-shaped, having a flat edge 228 and a semi-circular edge 230. The plate member 222 is not secured to the lid channel 216 or the top edge 212 of the side wall 204. A lip member 232 is secured to the semi-circular edge 230 of the plate member 222 such that the lip member 232 typically protrudes from the semicircular edge 230 of the plate member 222 and such that the lip member 232 is typically equispaced along the semi-circular edge 230 (i.e. centered along the semi-circular edge of the "D"). The plate member 222 is pivotally or hingeably secured by any suitable hinging means to the plate member 220 and has a pair of opposed cut-out sections 234—234 conforming to the contour of the generally triangular shaped stop members 42—42. As is evident from FIG. 23B, the plate 222 pivots along edge 228 and engages the top edge 212 of the side wall member 204 when in a closed position or posture.

The filter engaging means 40 is formed from or secured to the plate member 222, as best seen in FIG. 22. In this embodiment, the filter engaging means 40 (see FIG. 25) comprises a pair of opposed stanchions 240—240 which extend perpendicularly from the plate member 222 downward or internal to the side wall member 204. A generally cylindrical and hollow tube member 242 is suspended between the opposed stanchions 240—240 such that the combination of the stanchions 240—240 and the tube member 242 comprise a structure that is generally U-shaped. The tube member 242, as will be discussed is adapted for receiving a pair of opposed lugs or ears 252—252 of a gripping assembly 250 of the filter engaging means 40 (see FIG. 27). To this effect, the tube member 242 comprises opposed open ends 244—244 (see FIG. 22A) which receive ear members 252—252 of the gripping assembly 250.

Figure 27:
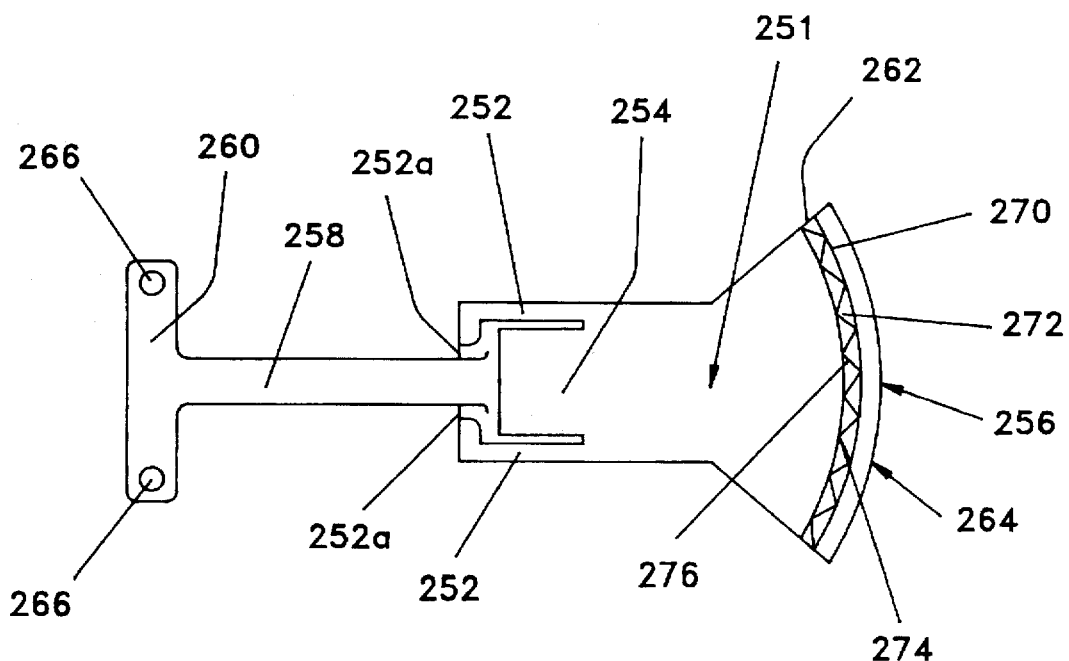
FIG. 27 is a top plan view of the second arm member of the filter engaging means of FIG. 25.
Figure 29A:
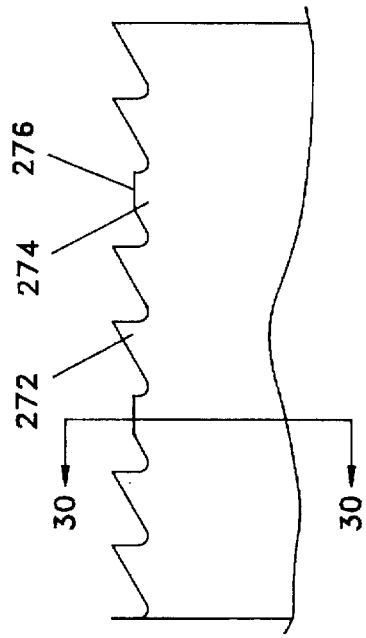
FIG. 29A is a side elevational view of the view depicted in FIG. 29.

The gripping assembly 250, as best shown in FIG. 27, comprises a generally flat, square body 254, having a flared end 256 formed of one edge, and a flexing bar member 258 extending from an end opposite the flared end 256. The gripping assembly 250 defines a top face 251 and a bottom face 249 thereof. The flexing bar member 258 comprises a long and thin structure, such that the bar member 258 is capable of flexing. Preferably, the gripping assembly 250 is formed or manufactured from a material that has an inherent degree of flexibility, such as by way of example only, nylon plastic, polyethylene(PE), or polypropylene(PP). The flexing bar member 258 has a T-cross member 260 secured to an end thereof, such that the combination of the flexing bar member 258 and the T-cross member 260 comprise a structure that is generally T-shaped. The T-cross member 260 has a pair of lug members 266—266 disposed thereon such that the lug members 266—266 are formed of the top face 251 of the gripping assembly 250. The ear members 252—252 typically define a structure that is generally L-shaped and extend from the body 254 of the gripping assembly such that ends 252a—252a of the"L" typically face each other. The flared end 256 comprises a smooth, semi-arcuate edge 264 and has a cut-out or channel 262 formed therein for receiving a blade assembly 270. The channel 262 is disposed in the top face of the gripping assembly 250.

Figure 28A:
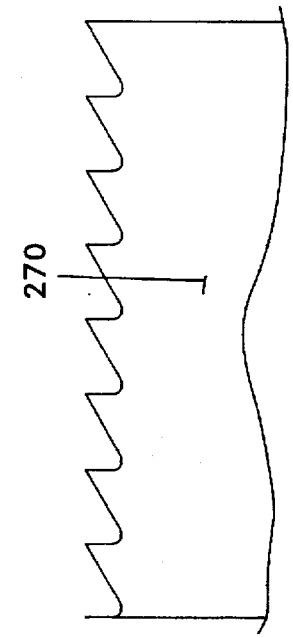
FIG. 28A is a side elevational view of the view depicted in FIG. 28.
Figure 28:
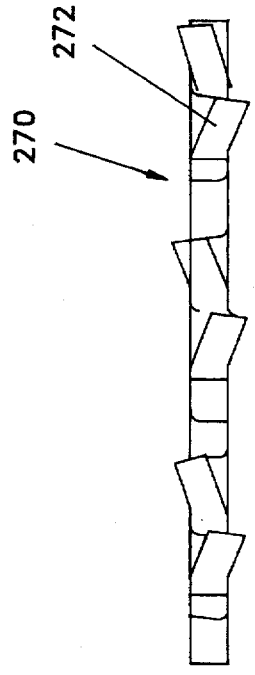
FIG. 28 is a top plan view of the teeth of the alternative embodiment of the filter engaging means of FIG. 22 prior to being processed.
Figure 29:
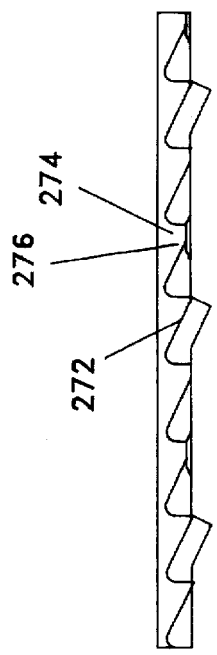
FIG. 29 is a top plan view of the teeth of the alternative embodiment of the filter engaging means of FIG. 22 subsequent to being processed.
Figure 30:
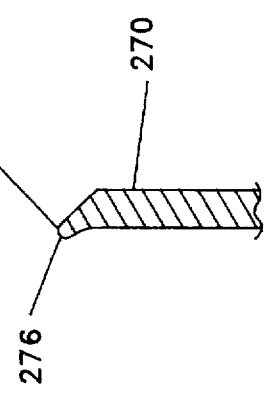
FIG. 30 is a vertical sectional view taken in direction of the arrows and along the plane of line 30—30 in FIG. 23B of the teeth of the filter engaging means subsequent to processing.

The blade assembly 270 is best seen in FIG. 28. In this embodiment, the blade assembly 270 comprises a typical ¼" saw blade having preferably about 18 teeth 272 per inch of alternating teeth, as shown in FIG. 28. The blade assembly 270 is machined or processed to produce a beveled edge on some of the teeth 274 of the blade assembly 270 to produce a blunted or beveled edge 276 on the surface of the teeth 274, as will be discussed. The teeth 272 of the blade assembly 270 are used to grip a filter 6, as discussed in the preceding. In this embodiment of the blade assembly 270 the flared teeth 274 that would protrude towards flared end 256 of the gripper assembly 250 are ground or machined to produce the blunted edge 276. This is a salient feature of this embodiment, as the blunted edge 276 prevents the blade assembly 278 from digging into the filter 6 too deeply and pulling too many filters 6 from the container 200.

Continuing to refer to the FIGS. 22–30 for operation and use of the embodiment of the coffee filter container and/or dispenser depicted therein, the top assembly 206 is removed from the container and/or dispenser and coffee filters 6 are disposed therein. The top assembly 206 is placed on the top edge 212 of the side wall member 204 such that the lug 219 of the lid channel 216 slidably engages recess 218 of the side wall member 204. The plate member 222 is closed (if it is not closed already) and the cut-out sections 234—234 of the lid pass over the stop members 42—42 which are secured to the lid channel 216, and semi-circular edge 230 of the plate member 222 engages the top edge 212 of the side wall member 204. The handle member 232 of the plate member 222 is operated to hingeably lift the plate member 222 relative to the plate member 220 and swing the filter engaging means 40 towards the coffee filters 6 disposed therein. The filter engaging means 40 operates similarly to the previous embodiments. Top face 251 and flared end 256 of the gripping assembly 250 swing towards the filters 6 and the blade assembly 270 engages same. The blunt edges 276 of the blade assembly 270 prevent the blade assembly 270 from picking up more than one filter 6. As the plate member 222 of the top assembly 206 is continually pivoted upwards and backwards, the filter engaging means 40 pulls the filter 6 against the stop members 42 and causes the filters 6 to engage same. The continual pressure on the plate member 222 forces the top most filter 6 from the stack and pulls same between the stop members 42—42 where it is removed from the filter engaging means 40 and used. In this embodiment, the filter engaging means 40 derives spring pressure from the flexing bar member 258. As the force of the plate members 222 as it is pivoted upwards forces the filter engaging means 40 backwards, the flexing bar member 258 provides enough resistance to maintain pressure on the top most filters 6, but flexes enough to prevent pulling more than one filter 6 between the stop members 42—42. The lugs 266 on the T-cross member 260 engage the outer edges of the stanchions 240 and prevent the body 254 of the gripping assembly from flexing to the left or the right (respective to the view of FIG. 23C).

Thus, by the practice of the present invention there is provided the coffee filter container for containing at least one coffee filter and for singularly dispensing the at least one coffee filter comprising the generally cylindrical sidewall member 204 having a sidewall top 212. The filter support member 202 is secured to the generally cylindrical sidewall member 204 for supporting at least one coffee filter 6. The top assembly 206 is removably secured to the generally cylindrical sidewall member 204, and comprises a structure defining the top planar member 220, a pair of arms 284—284 secured to the top planar member 220 in a generally planar relationship, the pair of stop members 42—42 having a stop member size and secured to the arms 284—284, and a lid member 222 pivotally secured to the top planar member 220 and substantially extending across the top planar member 220 and having a structure defining a pair of cut-outs 234—234 with cut-out openings slightly larger than the stop member size of the stop members 42—42. The means 208 for engaging the filter 6 is secured to the lid member 222 and comprises the pair of bifurcated stanchion members 240—240 secured to the lid member 222, the tube member 242 secured to respective ends of the pair of bifurcated stanchion members 240—240 and having the pair of tube recesses 244—244. The gripping assembly 250 is pivotally secured to the tube member 242 and defines the gripping body 254 which has a structure defining the pair of gripping arms 252—252 having secured thereto the pair of opposed protruding ear members 252a—252a with ear ends which rotatively reside in the tube recesses 244—244, the generally T-shaped flexible arm assembly 258 is secured to the gripper body, and the blade 270 is secured to the body. The blade has a structure defining teeth 272 having at the least one blunted tooth 274 and the least one pointed tooth 272.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A coffee filter container for containing at least one coffee filter and for singularly dispensing at least one coffee filter comprising:

a generally cylindrical sidewall member having a sidewall top;

a filter support member secured to said generally cylindrical sidewall member for supporting at least one coffee filter;

a top assembly removably secured to said generally cylindrical sidewall member, said top assembly comprising a structure defining a top planar member, a pair of arms secured to said top planar member in a generally planar relationship, a pair of stop members having a stop member size and secured to said arms, and a lid member pivotally secured to said top planar member and substantially extending across said top planar member and having a structure defining a pair of cut-outs with cut-out openings slightly larger than the stop member size of said stop members;

a means, secured to said lid member, for engaging a filter member; said means for engaging filters comprises a pair of bifurcated stanchion members secured to said lid member, a tube member secured to respective ends of said pair of bifurcated stanchion members and having a pair of tube recesses; and a gripping assembly pivotally secured to said tube member and defining a gripping body having a structure defining a pair of gripping arms having secured thereto a pair of opposed protruding ear members with ear ends which rotatively reside in said tube recesses, a generally T-shaped flexible arm assembly secured to the gripping body, and a blade secured to the gripping body and having a structure defining teeth having at least one blunted tooth and at least one pointed tooth.

2. The apparatus of claim 1 additionally comprising a lip member integrally secured to said lid member.

3. The apparatus of claim 2 wherein said top planar member and said lid member generally define a circular structure having a top circumference when said stop members are removably lodging within said cut-outs.

4. The apparatus of claim 3 additionally comprising a lip member integrally secured to said lid member such that said lip member extends beyond said top circumference.

5. The apparatus of claim 4 additionally comprising a pair of skirt members spacedly secured to said top planar member and to said arms of said top planar member such as to define a channel for receiving said sidewall top of said generally cylindrical side wall member.

6. The apparatus of claim 5 additionally comprising a lug member secured to said top planar member and to said skirt members for interconnecting said pair of skirt members.

7. The apparatus of claim 6 wherein at least one of said skirt members has a structure defining at least one nipple member protruding therefrom.

8. The apparatus of claim 7 wherein said sidewall top of said sidewall member has an opening for removably receiving said lug member and said sidewall member has a structure defining at least one recess for removably engaging said at least one nipple member.

9. An apparatus for containing at least one coffee filter and for dispensing at least one coffee filter comprising:

a generally hollow body;

a base secured to said generally hollow body;

a top assembly removably engaged to said generally hollow body and comprising a top planar member having a structure defining a first arm member secured to said top planar member, a second arm member secured to said top planar member, a first stop member secured to said first arm member, a second stop member secured to said second arm member, said top assembly comprising a lid member pivotally secured to said top planar member and substantially extending across said top planar member and having a structure defining a first cut-out having a first cut-out opening and a second cut-out having a second cut-out opening; and a means, secured to said lid member for engaging a filter.

10. A method for separating a single coffee filter from a plurality of superimposedly stacked coffee filters comprising the steps of:

(a) providing a coffee filter container and dispenser comprising a generally hollow body, a base secured to said generally hollow body, a top assembly removably engaged to said generally hollow body comprising a pivotally disposed lid member and a pair of oppose stop members, and a means for engaging a filter comprising a pair of bifurcated stanchion members, a tube member secured to respective ends of said pair of bifurcated stanchion members and having a pair of tube recesses; a gripping assembly pivotally secured to said tube member and defining a gripping body having a structure defining a pair of gripping arms having secured thereto a pair of opposed protruding ear members with ear ends which rotatively reside in said tube recesses, a generally T-shaped flexible arm assembly secured to the gripping body, and a blade secured to the gripping body and having a structure defining teeth having at least one blunted tooth and at least one pointed tooth;

(b) providing superimposedly stacked coffee filters;

(c) removing said top assembly and placing said coffee filters in said generally hollow body;

(d) closing said lid member of said top assembly;

(e) pivotally lifting on said lid member to simultaneously swing said means for engaging a coffee filter towards an edge of a single coffee filter;

(f) pulling said single coffee filter with said means for engaging of step (e) between said stop members to produce said single coffee filter.

* * * * *